United States Patent
Yang et al.

(10) Patent No.: US 10,317,931 B2
(45) Date of Patent: Jun. 11, 2019

(54) METHOD FOR MANAGING MULTI-CORE PROCESSOR, AND APPARATUS

(71) Applicant: Huawei Technologies Co., Ltd., Shenzhen (CN)

(72) Inventors: Tongzeng Yang, San Diego, CA (US); Konggang Wei, Shenzhen (CN); Yu Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 15/307,931

(22) PCT Filed: Jul. 14, 2014

(86) PCT No.: PCT/CN2014/082136
§ 371 (c)(1),
(2) Date: Oct. 31, 2016

(87) PCT Pub. No.: WO2016/008066
PCT Pub. Date: Jan. 21, 2016

(65) Prior Publication Data
US 2017/0052560 A1    Feb. 23, 2017

(51) Int. Cl.
*G06F 1/04* (2006.01)
*G06F 1/12* (2006.01)
(Continued)

(52) U.S. Cl.
CPC .............. *G06F 1/12* (2013.01); *G06F 1/08* (2013.01); *G06F 1/32* (2013.01); *G06F 1/3203* (2013.01);
(Continued)

(58) Field of Classification Search
CPC ........ G06F 1/12; G06F 1/3296; G06F 1/3225; G06F 1/3206; G06F 1/3203; G06F 1/324;
(Continued)

(56) References Cited

U.S. PATENT DOCUMENTS

| 7,549,024 B2 | 6/2009 | Piry et al. |
| 9,377,942 B2 | 6/2016 | Koo et al. |

(Continued)

FOREIGN PATENT DOCUMENTS

| CN | 101706742 A | 5/2010 |
| CN | 102004543 A | 4/2011 |

(Continued)

OTHER PUBLICATIONS

"Asymmetric multiprocessing" from Wikipedia, the free encyclopedia; Retrieved from "https://en.wikipedia.org/w/index.php?title=Asymmetric_multiprocessing&oldid=745756441"; 4 pages.

(Continued)

*Primary Examiner* — Xuxing Chen
(74) *Attorney, Agent, or Firm* — Fish & Richardson P.C.

(57) ABSTRACT

The present invention discloses a method for managing a multi-core processor. The method includes: if a current working mode of the multi-core processor is an asymmetric multiprocessing ASMP mode, a working frequency of at least one other processor than one processor that requests data is less than a first frequency, and a difference between a cache hit ratio value corresponding to the one processor and a cache hit ratio value corresponding to the at least one other processor is greater than or equal to a first threshold, switching the working mode of the multi-core processor to a symmetric multiprocessing SMP mode.

26 Claims, 6 Drawing Sheets

(51) Int. Cl.
| | |
|---|---|
| *G06F 15/16* | (2006.01) |
| *G06F 1/32* | (2019.01) |
| *G06F 1/08* | (2006.01) |
| *G06F 12/084* | (2016.01) |
| *G06F 12/0897* | (2016.01) |
| *G06F 1/3203* | (2019.01) |
| *G06F 1/3206* | (2019.01) |
| *G06F 1/3225* | (2019.01) |
| *G06F 1/324* | (2019.01) |
| *G06F 1/3296* | (2019.01) |

(52) U.S. Cl.
CPC ............ *G06F 1/324* (2013.01); *G06F 1/3206* (2013.01); *G06F 1/3225* (2013.01); *G06F 1/3296* (2013.01); *G06F 12/084* (2013.01); *G06F 12/0897* (2013.01); *G06F 2212/62* (2013.01); *Y02D 10/126* (2018.01); *Y02D 10/172* (2018.01)

(58) Field of Classification Search
CPC ...... G06F 12/0897; G06F 12/084; G06F 1/08; G06F 1/32; G06F 2212/62; Y02D 10/172; Y02D 10/126
See application file for complete search history.

(56) References Cited

U.S. PATENT DOCUMENTS

| | | |
|---|---|---|
| 2009/0182980 A1 | 7/2009 | Raghavareddy |
| 2013/0268787 A1 | 10/2013 | Koo et al. |
| 2014/0157284 A1 | 6/2014 | Sambasivan et al. |

FOREIGN PATENT DOCUMENTS

| | | |
|---|---|---|
| CN | 103019856 A | 4/2013 |
| CN | 103207659 A | 7/2013 |
| JP | 2009122925 A | 6/2009 |
| WO | 2010/106403 A | 9/2010 |

OTHER PUBLICATIONS

"Symmetric multiprocessing" from Wikipedia, the free encyclopedia; Retrieved from "https://en.wikipedia.org/w/index.php?title=Symmetric_multiprocessing&oldid=746504876"; 9 pages.

Betti et al., "Hard Real-Time Performances in Multiprocessor-Embedded Systems Using ASMP-Linux", Hindawi Publishing Corporation, Journal on Embedded Systems, vol. 2008, Article ID 582648, doi:10.1155/2008/582648, 19 pages.

Robin Randhawa et al., ARM big.LITTLE System Technology Application; http://www.eepw.com.cn/article/147851.htm; DOI:10.3959/j.issn. 1005-5517-2013-08-005 (4 pages) ; Machine Translation of article (13 pages).

Anonymity. "Mobility CPU Asynchronous Multi-Core and the Size of the Core of those Things"., http://www.hksilicon.com/kb/articles/104227/CPU, Dec. 8, 2012 (4 pages); Machine Translation of article (7 pages).

International Search Report issued in International Application No. PCT/CN2014/082136 dated Apr. 14, 2015, 14 pages.

Robin, R., "Software Techniques for ARM big.LITTLE Systems", http://community.arm.com/docs/DOC-2875, pp. 2 and 4-5, Oct. 17, 2013.

Extended European Search Report issued in European Application No. 14897637.6 dated May 10, 2017.

METHOD FOR MANAGING MULTI-CORE PROCESSOR, AND APPARATUS

CROSS-REFERENCE TO RELATED APPLICATIONS

This application is a National Stage of International Application No. PCT/CN2014/082136, filed on Jul. 14, 2014, which is hereby incorporated by reference in its entirety.

TECHNICAL FIELD

The present invention relates to the communications field, and in particular, to a method for managing a multi-core processor, and an apparatus.

BACKGROUND

A computer processes more content, and if only a dominant frequency of a single-core processor is increased, excessive heat is generated and performance cannot be correspondingly improved; therefore, a multi-core processor appears. A multi-core technology enables a computer to process tasks in parallel, exchanging time for space, and greatly improving performance of the computer. A design architecture of the multi-core processor is mainly classified as a synchronous (symmetric) architecture or an asynchronous (asymmetric) architecture. Processors in the synchronous architecture share all system resources, and processors in the asynchronous architecture manage respective resources.

In a symmetric multiprocessing (Symmetric Multiprocessing, SMP) architecture shown in FIG. 1, system resources are shared by all processors in a multi-core processor, a synchronous level 2 cache is used, all the processors use a same frequency and supply voltage, a system cannot adjust the frequency and the supply voltage for each core according to a usage rate, the level 2 cache is shared by all the processors, and a frequency of the level 2 cache cannot be individually adjusted for each processor.

When usage rates of all cores in the system are unbalanced, because in the SMP architecture, all the processors use a same frequency and supply voltage, a frequency and a supply voltage of a processor with a smaller task usage rate need to be subject to a frequency and a supply voltage of a processor with a larger task usage rate, which makes the frequency and the supply voltage of the processor with a smaller task usage have relatively large values, causing energy waste.

In an asymmetric multiprocessing (Asymmetric Multiprocessing, ASMP) architecture shown in FIG. 2, an asynchronous level 2 cache interface is used, and frequencies and supply voltages of all processors and level 2 caches can be separately adjusted according to a system usage rate.

When a hit rate of a level 1 cache of a processor is relatively low, data needs to be acquired from a level 2 cache. Because in the ASMP architecture, speeds of level 2 caches corresponding to processors can be separately adjusted according to a processor usage rate, if data to be acquired in this case is in a level 2 cache corresponding to a processor with a lower frequency, the processor needs to wait for a longer time before obtaining the data from a level 2 cache with a lower frequency; or if data to be acquired in this case is in a level 1 cache corresponding to a processor with a lower frequency, the processor needs to wait for a longer time before obtaining the data from the level 1 cache for the processor with a lower frequency. A longer processor waiting time decreases an actual usage rate of a processor, and within the waiting time, the processor is in a high-frequency and high-voltage state, affecting system power consumption.

SUMMARY

Embodiments of the present invention provide a method for managing a multi-core processor, and an apparatus, which are used to resolve technical problems, in the prior art, of power consumption and power loss that are caused by a same frequency and supply voltage in a case of unbalanced usage rates, and of power consumption and power loss in a case in which a level 1 cache hit rate of a processor is not high, and data needs to be acquired from a processor with a lower frequency and a corresponding cache.

According to a first aspect, the present invention provides a method for managing a multi-core processor, where the method includes: if a current working mode of the multi-core processor is an asymmetric multiprocessing ASMP mode, a working frequency of at least one other processor than one processor that requests data is less than a first frequency, and a difference between a cache hit ratio value corresponding to the one processor and a cache hit ratio value corresponding to the at least one other processor is greater than or equal to a first threshold, switching the working mode of the multi-core processor to a symmetric multiprocessing SMP mode; or if a current working mode of the multi-core processor is an SMP mode, a cache hit ratio value corresponding to the one processor is greater than or equal to a second threshold, usage rates are unbalanced between processors in the multi-core processor, and usage rates of N processors in the multi-core processor are greater than a first usage threshold, switching the working mode of the multi-core processor to an ASMP mode, where N is greater than or equal to 1, and is less than or equal to a quantity of processors in the multi-core processor minus one.

With reference to the first aspect, in a first possible implementation manner, the difference between the cache hit ratio value corresponding to the one processor and the cache hit ratio value corresponding to the at least one other processor is specifically a difference between a level 2 cache hit ratio value corresponding to the one processor and a level 2 cache hit ratio value corresponding to the at least one other processor; and the cache hit ratio value corresponding to the one processor is specifically a level 1 cache hit ratio value of the one processor.

With reference to the first aspect, in a second possible implementation manner, the difference between the cache hit ratio value corresponding to the one processor and the cache hit ratio value corresponding to the at least one other processor is specifically a difference between a level 2 cache hit ratio value corresponding to the one processor and a level 2 cache hit ratio value corresponding to the at least one other processor; and the cache hit ratio value corresponding to the one processor is specifically the level 2 cache hit ratio value corresponding to the one processor.

With reference to the first aspect, in a third possible implementation manner, the difference between the cache hit ratio value corresponding to the one processor and the cache hit ratio value corresponding to the at least one other processor is specifically a difference between a level 1 cache hit ratio value corresponding to the one processor and a level 1 cache hit ratio value corresponding to the at least one other processor; and the cache hit ratio value corresponding to the one processor is specifically the level 1 cache hit ratio value of the one processor.

With reference to the first aspect, in a fourth possible implementation manner, the difference between the cache hit ratio value corresponding to the one processor and the cache hit ratio value corresponding to the at least one other processor is specifically a difference between a level 1 cache hit ratio value corresponding to the one processor and a level 1 cache hit ratio value corresponding to the at least one other processor; and the cache hit ratio value corresponding to the one processor is specifically a level 2 cache hit ratio value corresponding to the one processor.

With reference to the first aspect and the first to the fourth possible implementation manners, in a fifth possible implementation manner, after the working mode of the multi-core processor is switched to the SMP mode, or the working mode of the multi-core processor is switched to the ASMP mode, an association relationship between an application scenario of a chip system in which the multi-core processor is located and the switched-to working mode of the multi-core processor is stored.

With reference to the fifth possible implementation manner, in a sixth possible implementation manner, that after the working mode of the multi-core processor is switched to the SMP mode, or the working mode of the multi-core processor is switched to the ASMP mode, an association relationship between an application scenario of a chip system in which the multi-core processor is located and the switched-to working mode of the multi-core processor is stored includes: if within a first predetermined time interval, a corresponding quantity of use times of the application scenario of the chip system in which the multi-core processor is located is greater than or equal to B1, and a ratio of a quantity of use times of a working mode, whose quantity of use times is relatively large, of the multi-core processor to a quantity of use times of a working mode, whose quantity of use times is relatively small, of the multi-core processor is greater than or equal to M, storing the association relationship between the application scenario of the chip system in which the multi-core processor is located and the switched-to working mode of the multi-core processor, where M is an integer greater than 1, and B1 is an integer greater than or equal to 2.

With reference to the sixth possible implementation manner, in a seventh possible implementation manner, that after the working mode of the multi-core processor is switched to the SMP mode, or the working mode of the multi-core processor is switched to the ASMP mode, an association relationship between an application scenario of a chip system in which the multi-core processor is located and the switched-to working mode of the multi-core processor is stored further includes: if within the first predetermined time interval, the corresponding quantity of use times of the application scenario of the chip system in which the multi-core processor is located is less than B1, or the ratio of the quantity of use times of the working mode, whose quantity of use times is relatively large, of the multi-core processor to the quantity of use times of the working mode, whose quantity of use times is relatively small, of the multi-core processor is less than M, and within a second predetermined time interval after the first predetermined time interval, if within the second predetermined time interval, the corresponding quantity of use times of the application scenario of the chip system in which the multi-core processor is located is greater than or equal to B2, and the ratio of the quantity of use times of the working mode, whose quantity of use times is relatively large, of the multi-core processor to the quantity of use times of the working mode, whose quantity of use times is relatively small, of the multi-core processor is greater than or equal to M, storing the association relationship between the application scenario of the chip system in which the multi-core processor is located and the switched-to working mode of the multi-core processor, where B2 is an integer greater than or equal to 1.

With reference to the fifth to the seventh possible implementation manners, in an eighth possible implementation manner, within a third predetermined time interval after the association relationship is stored in a database, the step in the first aspect is performed, and if after the performing, an obtained working mode of the multi-core processor indicates that a working mode, which corresponds to the application scenario, of the multi-core processor is different from a stored working mode, which corresponds to the application scenario, of the multi-core processor, the association relationship between the application scenario of the chip system in which the multi-core processor is located and the switched-to working mode of the multi-core processor is cleared.

With reference to the fifth to the eighth possible implementation manners, in a ninth possible implementation manner, the method further includes: searching, according to a current application scenario of the chip system in which the multi-core processor is located, for a working mode, which is associated with the current application scenario, of the multi-core processor; and if the working mode, which is associated with the current application scenario, of the multi-core processor is found, determining that a current working mode of the multi-core processor is the found working mode of the multi-core processor; or if the working mode, which is associated with the current application scenario, of the multi-core processor is not found, performing the step in the first aspect to determine the working mode, which is associated with the current application scenario, of the multi-core processor.

According to a second aspect, the present invention provides a processor, including a processing hardware platform, where the processing hardware platform executes an instruction that is stored in a non-volatile computer readable storage medium, to perform functions of multiple modules, where the multiple modules include: an acquiring module, configured to acquire a working frequency of at least one other processor than one processor that requests data, a difference between a cache hit ratio value corresponding to the one processor and a cache hit ratio value corresponding to the at least one other processor, a cache hit ratio value corresponding to the one processor, and usage rates of N processors in the multi-core processor; a judging module, configured to determine, when a current working mode of the multi-core processor is an asymmetric multiprocessing ASMP mode, whether the working frequency of the at least one other processor than the one processor that requests data is less than a first frequency, and whether the difference between the cache hit ratio value corresponding to the one processor and the cache hit ratio value corresponding to the at least one other processor is greater than or equal to a first threshold; and configured to determine, when the current working mode of the multi-core processor is an SMP mode, whether the cache hit ratio value corresponding to the one processor is greater than or equal to a second threshold, whether the usage rates are unbalanced between the processors in the multi-core processor, and whether usage rates of N processors in the multi-core processor are greater than a first usage threshold; and a switching module, configured to:

when the judging module determines that the current working mode of the multi-core processor is the asymmetric multiprocessing ASMP mode, the working frequency of the at least one other processor than the one processor that requests data is less than the first frequency, and the difference between the cache hit ratio value corresponding to the one processor and the cache hit ratio value corresponding to the at least one other processor is greater than or equal to the first threshold, switch the working mode of the multi-core processor to the symmetric multiprocessing SMP mode; or when the judging module determines that the current working mode of the multi-core processor is the SMP mode, the cache hit ratio value corresponding to the one processor is greater than or equal to the second threshold, the usage rates are unbalanced between the processors in the multi-core processor, and the usage rates of the N processors in the multi-core processor are greater than the first usage threshold, switch the working mode of the multi-core processor to the ASMP mode, where N is greater than or equal to 1, and is less than or equal to a quantity of processors in the multi-core processor minus one.

With reference to the second aspect, in a first possible implementation manner, the difference between the cache hit ratio value corresponding to the one processor and the cache hit ratio value corresponding to the at least one other processor is specifically a difference between a level 2 cache hit ratio value corresponding to the one processor and a level 2 cache hit ratio value corresponding to the at least one other processor; and the cache hit ratio value corresponding to the one processor is specifically a level 1 cache hit ratio value of the one processor.

With reference to the second aspect, in a second possible implementation manner, the difference between the cache hit ratio value corresponding to the one processor and the cache hit ratio value corresponding to the at least one other processor is specifically a difference between a level 2 cache hit ratio value corresponding to the one processor and a level 2 cache hit ratio value corresponding to the at least one other processor; and the cache hit ratio value corresponding to the one processor is specifically the level 2 cache hit ratio value of the one processor.

With reference to the second aspect, in a third possible implementation manner, the difference between the cache hit ratio value corresponding to the one processor and the cache hit ratio value corresponding to the at least one other processor is specifically a difference between a level 1 cache hit ratio value corresponding to the one processor and a level 1 cache hit ratio value corresponding to the at least one other processor; and the cache hit ratio value corresponding to the one processor is specifically the level 1 cache hit ratio value of the one processor.

With reference to the second aspect, in a fourth possible implementation manner, the difference between the cache hit ratio value corresponding to the one processor and the cache hit ratio value corresponding to the at least one other processor is specifically a difference between a level 1 cache hit ratio value corresponding to the one processor and a level 1 cache hit ratio value corresponding to the at least one other processor; and the cache hit ratio value corresponding to the one processor is specifically a level 2 cache hit ratio value corresponding to the one processor.

With reference to the second aspect and the first to the fourth possible implementation manners, in a fifth possible implementation manner, the multiple modules further include: a storage module, configured to: after the working mode of the multi-core processor is switched to the SMP mode, or the working mode of the multi-core processor is switched to the ASMP mode, store an association relationship between an application scenario of a chip system in which the multi-core processor is located and the switched-to working mode of the multi-core processor.

With reference to the fifth possible implementation manner, in a sixth possible implementation manner, the storage module is specifically configured to: when within a first predetermined time interval, a corresponding quantity of use times of the application scenario of the chip system in which the multi-core processor is located is greater than or equal to B1, and a ratio of a quantity of use times of a working mode, whose quantity of use times is relatively large, of the multi-core processor to a quantity of use times of a working mode, whose quantity of use times is relatively small, of the multi-core processor is greater than or equal to M, store the association relationship between the application scenario of the chip system in which the multi-core processor is located and the switched-to working mode of the multi-core processor, where M is an integer greater than 1, and B1 is an integer greater than or equal to 2.

With reference to the sixth possible implementation manner, in a seventh possible implementation manner, the storage module is further configured to: when within the first predetermined time interval, the corresponding quantity of use times of the application scenario of the chip system in which the multi-core processor is located is less than B1, or the ratio of the quantity of use times of the working mode, whose quantity of use times is relatively large, of the multi-core processor to the quantity of use times of the working mode, whose quantity of use times is relatively small, of the multi-core processor is less than M, and within a second predetermined time interval after the first predetermined time interval, if within the second predetermined time interval, the corresponding quantity of use times of the application scenario of the chip system in which the multi-core processor is located is greater than or equal to B2, and the ratio of the quantity of use times of the working mode, whose quantity of use times is relatively large, of the multi-core processor to the quantity of use times of the working mode, whose quantity of use times is relatively small, of the multi-core processor is greater than or equal to M, store the association relationship between the application scenario of the chip system in which the multi-core processor is located and the switched-to working mode of the multi-core processor, where B2 is an integer greater than or equal to 1.

With reference to the fifth to the seventh possible implementation manners, in an eighth possible implementation manner, the multiple modules further include:

an execution module, configured to: within a third predetermined time interval after the association relationship is stored in a database, perform the step in the second aspect, where the judging module is further configured to determine whether an execution result indicates that a working mode, which corresponds to the application scenario, of the multi-core processor is different from a working mode, which corresponds to the application scenario and is stored in a learning database, of the multi-core processor; and a clearance module, configured to: when a determining result of the judging module indicates that the working mode, which corresponds to the application scenario, of the multi-core processor is different from the working mode, which corresponds to the application scenario and is stored in the learning database, of the multi-core processor, clear the association relationship between the application scenario of the chip system in which the multi-core processor is located and the switched-to working mode of the multi-core processor.

With reference to the fifth to the eighth possible implementation manners, in a ninth possible implementation manner, the multiple modules further include: a search module, configured to search, according to a current application scenario of the chip system in which the multi-core processor is located, for a working mode, which is associated with the current application scenario, of the multi-core processor; and a determining module, configured to: when the working mode, which is associated with the current application scenario, of the multi-core processor is found, determine that a current working mode of the multi-core processor is the found working mode of the multi-core processor; or when the working mode, which is associated with the current application scenario, of the multi-core processor is not found, perform the step in the second aspect to determine the working mode, which is associated with the current application scenario, of the multi-core processor.

With reference to the second aspect and the first to the ninth possible implementation manners, in a tenth possible implementation manner, the processor is one processor in the multi-core processor.

With reference to the second aspect and the first to the ninth possible implementation manners, in an eleventh possible implementation manner, the processor is a scheduling processor.

With reference to the eleventh possible implementation manner, in a twelfth possible implementation manner, the acquiring module is specifically configured to acquire, from a memory in the multi-core processor, a level 1 cache hit rate value, which is stored in the memory by one processor in the multi-core processor, of the one processor in the multi-core processor.

According to a third aspect, the present invention provides a processor, including: an acquiring module, configured to acquire a working frequency of at least one other processor than one processor that requests data, a difference between a cache hit ratio value corresponding to the one processor and a cache hit ratio value corresponding to the at least one other processor, a cache hit ratio value corresponding to the one processor, and usage rates of N processors in the multi-core processor; a judging module, configured to determine, when a current working mode of the multi-core processor is an asymmetric multiprocessing ASMP mode, whether the working frequency of the at least one other processor than the one processor that requests data is less than a first frequency, and whether the difference between the cache hit ratio value corresponding to the one processor and the cache hit ratio value corresponding to the at least one other processor is greater than or equal to a first threshold; and configured to determine, when the current working mode of the multi-core processor is an SMP mode, whether the cache hit ratio value corresponding to the one processor is greater than or equal to a second threshold, whether the usage rates are unbalanced between the processors in the multi-core processor, and whether usage rates of N processors in the multi-core processor are greater than a first usage threshold; and a switching module, configured to: when the judging module determines that the current working mode of the multi-core processor is the asymmetric multiprocessing ASMP mode, the working frequency of the at least one other processor than the one processor that requests data is less than the first frequency, and the difference between the cache hit ratio value corresponding to the one processor and the cache hit ratio value corresponding to the at least one other processor is greater than or equal to the first threshold, switch the working mode of the multi-core processor to the symmetric multiprocessing SMP mode; or when the judging module determines that the current working mode of the multi-core processor is the SMP mode, the cache hit ratio value corresponding to the one processor is greater than or equal to the second threshold, the usage rates are unbalanced between the processors in the multi-core processor, and the usage rates of the N processors in the multi-core processor are greater than the first usage threshold, switch the working mode of the multi-core processor to the ASMP mode, where N is greater than or equal to 1, and is less than or equal to a quantity of processors in the multi-core processor minus one.

With reference to the third aspect, in a first possible implementation manner, the difference between the cache hit ratio value corresponding to the one processor and the cache hit ratio value corresponding to the at least one other processor is specifically a difference between a level 2 cache hit ratio value corresponding to the one processor and a level 2 cache hit ratio value corresponding to the at least one other processor; and the cache hit ratio value corresponding to the one processor is specifically a level 1 cache hit ratio value of the one processor.

With reference to the third aspect, in a second possible implementation manner, the difference between the cache hit ratio value corresponding to the one processor and the cache hit ratio value corresponding to the at least one other processor is specifically a difference between a level 2 cache hit ratio value corresponding to the one processor and a level 2 cache hit ratio value corresponding to the at least one other processor; and the cache hit ratio value corresponding to the one processor is specifically the level 2 cache hit ratio value of the one processor.

With reference to the third aspect, in a third possible implementation manner, the difference between the cache hit ratio value corresponding to the one processor and the cache hit ratio value corresponding to the at least one other processor is specifically a difference between a level 1 cache hit ratio value corresponding to the one processor and a level 1 cache hit ratio value corresponding to the at least one other processor; and the cache hit ratio value corresponding to the one processor is specifically the level 1 cache hit ratio value of the one processor.

With reference to the third aspect, in a fourth possible implementation manner, the difference between the cache hit ratio value corresponding to the one processor and the cache hit ratio value corresponding to the at least one other processor is specifically a difference between a level 1 cache hit ratio value corresponding to the one processor and a level 1 cache hit ratio value corresponding to the at least one other processor; and the cache hit ratio value corresponding to the one processor is specifically a level 2 cache hit ratio value corresponding to the one processor.

With reference to the third aspect and the first to the fourth possible implementation manners, in a fifth possible implementation manner, the processor further includes: a storage module, configured to: after the working mode of the multi-core processor is switched to the SMP mode, or the working mode of the multi-core processor is switched to the ASMP mode, store an association relationship between an application scenario of a chip system in which the multi-core processor is located and the switched-to working mode of the multi-core processor.

With reference to the fifth possible implementation manner, in a sixth possible implementation manner, the storage module is specifically configured to: when within a first predetermined time interval, a corresponding quantity of use times of the application scenario of the chip system in which the multi-core processor is located is greater than or equal to B1, and a ratio of a quantity of use times of a working mode, whose quantity of use times is relatively large, of the multi-core processor to a quantity of use times of a working mode, whose quantity of use times is relatively small, of the multi-core processor is greater than or equal to M, store the association relationship between the application scenario of the chip system in which the multi-core processor is located and the switched-to working mode of the multi-core processor, where M is an integer greater than 1, and B1 is an integer greater than or equal to 2.

With reference to the sixth possible implementation manner, in a seventh possible implementation manner, the storage module is further configured to: when within the first predetermined time interval, the corresponding quantity of use times of the application scenario of the chip system in which the multi-core processor is located is less than B1, or the ratio of the quantity of use times of the working mode, whose quantity of use times is relatively large, of the multi-core processor to the quantity of use times of the working mode, whose quantity of use times is relatively small, of the multi-core processor is less than M, and within a second predetermined time interval after the first predetermined time interval, if within the second predetermined time interval, the corresponding quantity of use times of the application scenario of the chip system in which the multi-core processor is located is greater than or equal to B2, and the ratio of the quantity of use times of the working mode, whose quantity of use times is relatively large, of the multi-core processor to the quantity of use times of the working mode, whose quantity of use times is relatively small, of the multi-core processor is greater than or equal to M, store the association relationship between the application scenario of the chip system in which the multi-core processor is located and the switched-to working mode of the multi-core processor, where B2 is an integer greater than or equal to 1.

With reference to the fifth to the seventh possible implementation manners, in an eighth possible implementation manner, the processor further includes:

an execution module, configured to: within a third predetermined time interval after the association relationship is stored in a database, perform the step in the second aspect, where the judging module is further configured to determine whether an execution result indicates that a working mode, which corresponds to the application scenario, of the multi-core processor is different from a working mode, which corresponds to the application scenario and is stored in a learning database, of the multi-core processor; and a clearance module, configured to: when a determining result of the judging module indicates that the working mode, which corresponds to the application scenario, of the multi-core processor is different from the working mode, which corresponds to the application scenario and is stored in the learning database, of the multi-core processor, clear the association relationship between the application scenario of the chip system in which the multi-core processor is located and the switched-to working mode of the multi-core processor.

With reference to the fifth to the eighth possible implementation manners, in a ninth possible implementation manner, the processor further includes: a search module, configured to search, according to a current application scenario of the chip system in which the multi-core processor is located, for a working mode, which is associated with the current application scenario, of the multi-core processor; and a determining module, configured to: when the working mode, which is associated with the current application scenario, of the multi-core processor is found, determine that a current working mode of the multi-core processor is the found working mode of the multi-core processor; or when the working mode, which is associated with the current application scenario, of the multi-core processor is not found, perform the step in the second aspect to determine the working mode, which is associated with the current application scenario, of the multi-core processor.

With reference to the third aspect and the first to the ninth possible implementation manners, in a tenth possible implementation manner, the processor is one processor in the multi-core processor.

With reference to the third aspect and the first to the ninth possible implementation manners, in an eleventh possible implementation manner, the processor is a scheduling processor.

With reference to the eleventh possible implementation manner, in a twelfth possible implementation manner, the acquiring module is specifically configured to acquire, from a memory in the multi-core processor, a level 1 cache hit rate value, which is stored in the memory by one processor in the multi-core processor, of the one processor in the multi-core processor.

According to a fourth aspect, the present invention provides a multi-core processor, including the processors according to the second aspect and the first to the twelfth possible implementation manners of the second aspect, and the third aspect and the first to the twelfth possible implementation manners of the third aspect.

According to a fifth aspect, the present invention provides a chip system, including the multi-core processor according to the fourth aspect.

According to a sixth aspect, the present invention provides a terminal, including the chip system according to the fifth aspect.

According to a seventh aspect, the present invention provides a computer program product, where the computer program product includes a non-volatile computer readable storage medium, where an instruction executed by the processor is stored in the non-volatile computer readable storage medium, and the instruction includes the steps according to any one of the first aspect and the first to the ninth possible implementation manners of the first aspect.

According to an eighth aspect, the present invention provides a computer readable storage medium, where computer program code is stored in the computer, and when the computer program code is executed by a computer, the computer program code can enable the computer to perform the steps according to any one of the first aspect and the first to the ninth possible implementation manners of the first aspect.

The one or more technical solutions in the embodiments of this application have at least the following technical effects:

According to the method for managing a multi-core processor in the present invention, whether a working mode of the multi-core processor should be in an SMP mode or an ASMP mode is determined according to whether a working frequency of at least one other processor than one processor that requests data is less than a first frequency, and whether a difference between a cache hit ratio value corresponding to the one processor and a cache hit ratio value corresponding to the at least one other processor is greater than or equal to a first threshold; and whether the cache hit ratio value corresponding to the one processor is greater than or equal to a second threshold, whether usage rates are unbalanced between processors in the multi-core processor, and whether usage rates of N processors in the multi-core processor are greater than a first usage threshold. In this way, the multi-core processor selects the ASMP mode in a case in which the usage rates are unbalanced and the usage rates of the processors in the multi-core processor are relatively high, thereby avoiding power consumption and power loss that are caused by a same frequency and supply voltage; and the multi-core processor selects the SMP mode in a case in which a level 1 cache hit rate of a processor is not high, and data needs to be acquired from a cache corresponding to a processor with a lower frequency, which therefore can also avoid unnecessary power consumption and power loss.

DESCRIPTION OF EMBODIMENTS

The following describes a main implementation principle, specific implementation manners, and corresponding achievable benefits of the technical solutions provided in the embodiments of the application with reference to the accompanying drawings.

It should be noted that, processors and multi-core processors involved in the full text in all the embodiments of the present invention are in a hardware or firmware form, and are not software in any form.

Embodiment 1

Figure 3:
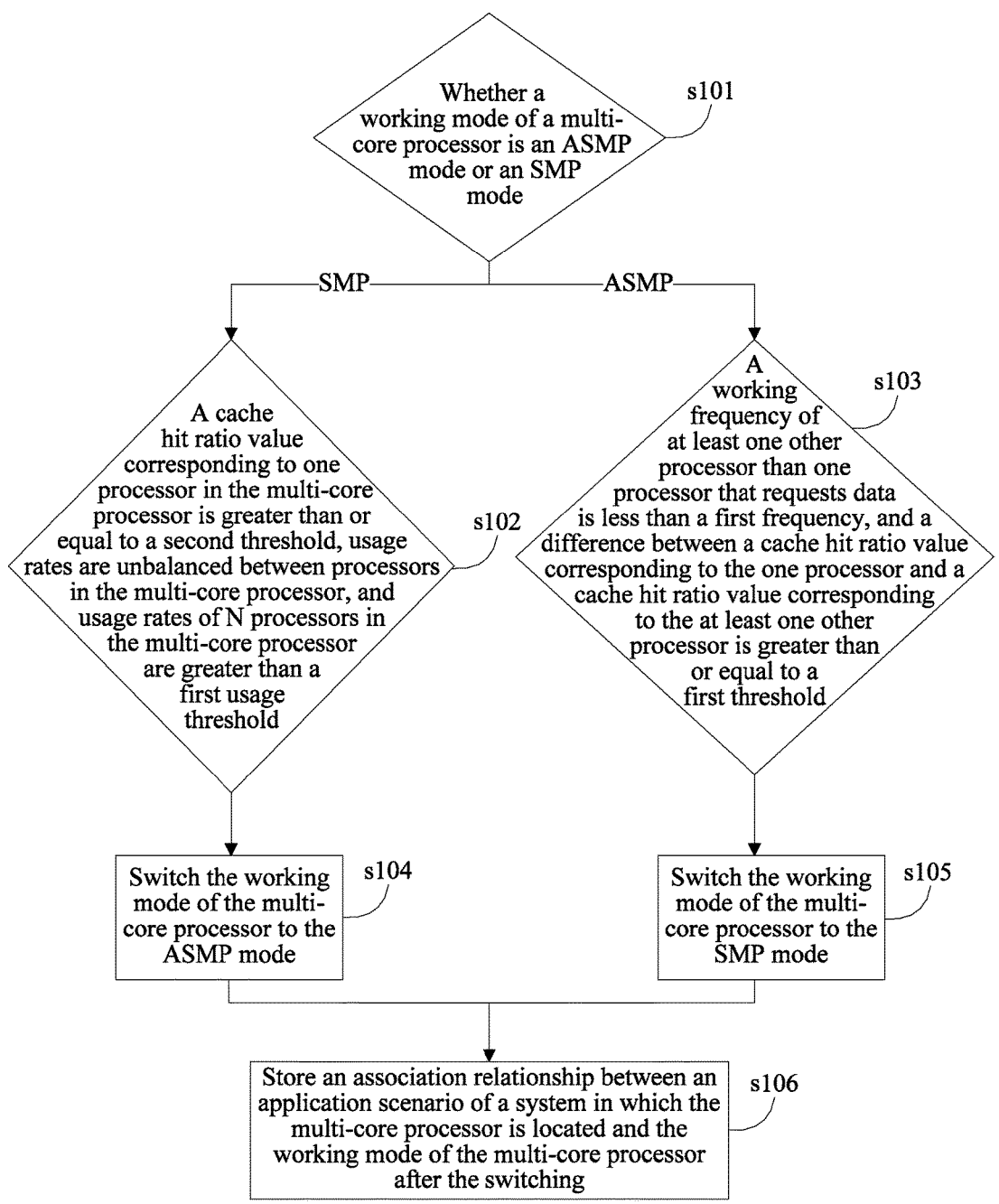
FIG. 3 is a flowchart of a method for managing a multi-core processor according to Embodiment 1 to Embodiment 3 of the present invention.

FIG. 3 is a flowchart of a method for managing a multi-core processor according to Embodiment 1 of the present invention.

Step S101: Determine whether a current working mode of the multi-core processor is an ASMP mode or an SMP mode. If the working mode is the SMP mode, go to step S102. If the working mode is the ASMP mode, go to step S103.

Step S102: When it is determined that a cache hit ratio value corresponding to the one processor is greater than or equal to a second threshold, usage rates are unbalanced between processors in the multi-core processor, and usage rates of N processors in the multi-core processor are greater than a first usage threshold, go to step S104.

Step S103: When it is determined that a working frequency of at least one other processor than one processor that requests data is less than a first frequency, and a difference between a cache hit ratio value corresponding to the one processor and a cache hit ratio value corresponding to the at least one other processor is greater than or equal to a first threshold, go to step S105.

Step S104: Switch the current working mode of the multi-core processor to the ASMP mode.

Step S105: Switch the working mode of the multi-core processor to the SMP mode.

N is greater than or equal to 1, and is less than or equal to a quantity of processors in the multi-core processor minus one.

In Embodiment 1 of the present invention, a technical solution is used, where whether a working mode of the multi-core processor should be in an SMP mode or an ASMP mode is determined according to determining conditions, for example, whether a working frequency of at least one other processor than one processor that requests data is less than a first frequency, and whether a difference between a cache hit ratio value corresponding to the one processor and a cache hit ratio value corresponding to the at least one other processor is greater than or equal to a first threshold; and whether the cache hit ratio value corresponding to the one processor is greater than or equal to a second threshold, whether usage rates are unbalanced between processors in the multi-core processor, and whether usage rates of N processors in the multi-core processor are greater than a first usage threshold. In this way, the multi-core processor selects the ASMP mode in a case in which the usage rates are unbalanced and the usage rates of the processors in the multi-core processor are relatively high, thereby avoiding power consumption and power loss that are caused by a same frequency and supply voltage; and the multi-core processor selects the SMP mode in a case in which a level 1 cache hit rate of a processor is not high, and data needs to be acquired from a cache corresponding to a processor with a lower frequency, which therefore can also avoid unnecessary power consumption and power loss.

Embodiment 2

This embodiment is based on Embodiment 1, and differences between this embodiment and Embodiment 1 are as follows, where the differences may be independent from each other:

In step S102 in Embodiment 1, the cache hit ratio value corresponding to the one processor may be specifically a level 1 cache hit ratio value of one processor or a level 2 cache hit ratio value corresponding to one processor.

Figure 1:
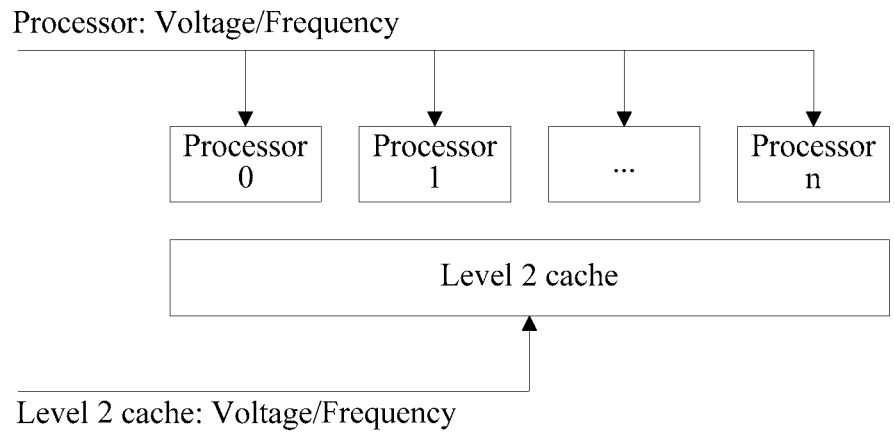
FIG. 1 is a schematic diagram of an SMP architecture according to the prior art.
Figure 2:
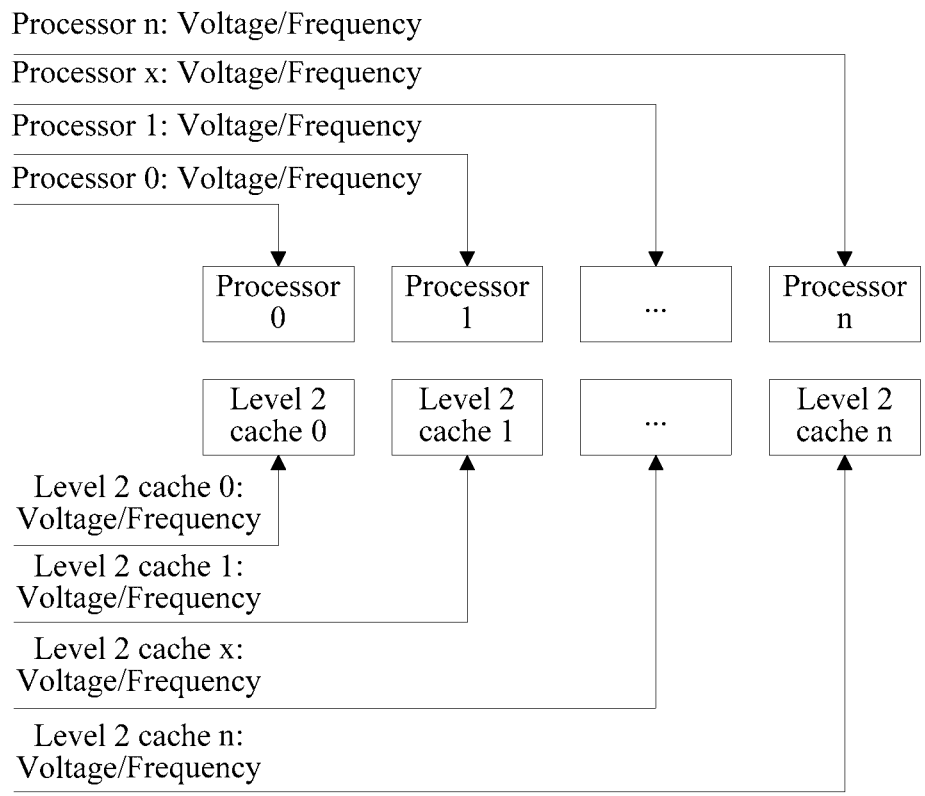
FIG. 2 is a schematic diagram of an ASMP architecture according to the prior art.

In step S102 in Embodiment 1, level 2 caches of all processors are physically connected to each other (as shown in FIG. 1); however, in logic, division may still be performed as shown in FIG. 2, where each processor has a level 2 cache area corresponding to each processor, only that the level 2 cache corresponding to each processor has a same working voltage and working frequency.

The level 1 cache hit ratio value refers to a value of a hit rate of a level 1 cache. A specific calculation manner is: a level 1 cache hit rate=a level 1 cache hit quantity/(the level 1 cache hit quantity+a level 1 cache miss quantity). For example, the level 1 cache receives 100 pieces of requested data, where 50 pieces are hit, and then the hit rate of the level 1 cache is 50/100=50%.

There are two specific calculation manners for the level 2 cache hit ratio value.

One calculation manner includes: a level 2 cache hit rate value=a level 2 cache hit quantity/(the level 2 cache hit quantity+a level 2 cache miss quantity). For example, one processor receives 100 pieces of requested data, where a level 1 cache of the processor hits 50 pieces, and a level 2 cache corresponding to the processor hits 49 pieces. Therefore, according to such a calculation manner, a level 2 cache hit ratio value corresponding to the processor is 49/(100−50)=98%.

The other calculation manner includes: a level 2 cache hit ratio value=a level 2 cache hit quantity/a total quantity of pieces of requested data received by one processor. For example, one processor receives 100 pieces of requested data, where a level 1 cache of the processor hits 50 pieces, and a level 2 cache corresponding to the processor hits 49 pieces. Therefore, according to such a calculation manner, a level 2 cache hit ratio value is 49/100=49%.

In step S103 in Embodiment 1, the difference between the cache hit ratio value corresponding to the one processor and the cache hit ratio value corresponding to the at least one other processor may be specifically a difference between a level 2 cache hit ratio value corresponding to the one processor and a level 2 cache hit ratio value corresponding to the at least one other processor, or a difference between a level 1 cache hit ratio value corresponding to the one processor and a level 1 cache hit ratio value corresponding to the at least one other processor.

There are two calculation manners for the difference between the level 2 cache hit ratio value corresponding to the one processor and the level 2 cache hit ratio value corresponding to the at least one other processor.

One calculation manner is: a quantity of pieces of data, which is hit by a level 2 cache corresponding to at least one other processor, in data requested by one processor/a quantity of pieces of data that is requested by the one processor and that is received by the level 2 cache corresponding to the at least one other processor. For example, one processor requests 100 pieces of data, where a level 1 cache of the processor hits 50 pieces, and a level 2 cache corresponding to at least one other processor hits 49 pieces of the remaining 50 pieces. Therefore, according to such a calculation manner, a difference between a level 2 cache hit ratio value corresponding to the one processor and the level 2 cache hit ratio value corresponding to the at least one other processor is 49/(100−50)=98%.

The other calculation manner is: a quantity of pieces of data, which is hit by a level 2 cache corresponding to at least one other processor, in data requested by one processor/a quantity of pieces of the data requested by the one processor. For example, one processor requests 100 pieces of data, where a level 1 cache of the processor hits 50 pieces, and a level 2 cache corresponding to at least one other processor hits 49 pieces of the remaining 50 pieces. Therefore, according to such a calculation manner, a difference between a level 2 cache hit ratio value corresponding to the one processor and the level 2 cache hit ratio value corresponding to the at least one other processor is 49/100=49%.

There are two calculation manners for the difference between the level 1 cache hit ratio value corresponding to the one processor and the level 1 cache hit ratio value corresponding to the at least one other processor.

One calculation manner is: a quantity of pieces of data, which is hit by a level 1 cache corresponding to at least one other processor, in data requested by one processor/a quantity of pieces of data that is requested by the one processor and that is received by the level 1 cache corresponding to the at least one other processor. For example, one processor requests 100 pieces of data, where a level 1 cache of the processor hits 50 pieces, and a level 2 cache corresponding to at least one other processor hits 25 pieces of the remaining 50 pieces. A level 1 cache corresponding to the at least one other processor hits 24 pieces of the remaining 25 pieces. Therefore, according to such a calculation manner, a difference between a level 1 cache hit ratio value corresponding to the one processor and the level 1 cache hit ratio value corresponding to the at least one other processor is 24/25=96%.

The other calculation manner is: a quantity of pieces of data, which is hit by a level 1 cache corresponding to at least one other processor, in data requested by one processor/a quantity of pieces of the data requested by the one processor. For example, one processor requests 100 pieces of data, where a level 1 cache of the processor hits 50 pieces, and a level 2 cache corresponding to at least one other processor hits 25 pieces of the remaining 50 pieces. A level 1 cache corresponding to the at least one other processor hits 24 pieces of the remaining 25 pieces. Therefore, according to such a calculation manner, a difference between a level 1 cache hit ratio value corresponding to the one processor and the level 1 cache hit ratio value corresponding to the at least one other processor is 24/100=24%.

A time interval for acquiring a cache hit rate value of one processor in the multi-core processor is generally in milliseconds, for example, may be set to 20 milliseconds.

A cache corresponding to one processor includes a level 1 cache and a level 2 cache that correspond to the processor. As shown in FIG. 1 and FIG. 2, a level 1 cache (which is not shown in the figure) corresponding to a processor is located inside the processor, and a level 2 cache corresponding to a processor is located outside the processor. As shown in FIG. 1, processors share a same level 2 cache. As shown in FIG. 2, although level 2 caches corresponding to the processors are logically separated and separately belong to the processors, the level 2 caches corresponding to the processors are connected to each other to form a complete storage area. Neither of a range of a first threshold and a range of a second threshold is limited. Theoretically, both the first threshold and the second threshold may be any value between 1% and 100%. Specifically, both the first threshold and the second threshold may be an empirical value. For example, both the first threshold and the second threshold may be 80%. A cache hit ratio which is an average concept is used herein, which helps reduce switching result fluctuation caused by use of a transient concept, that is, whether currently requested data is hit (obtained by means of requesting).

When one processor requests data, the processor first searches a level 1 cache corresponding to the processor for the data. When the processor does not find the data in the level 1 cache corresponding to the processor, the processor finds, according to an address correspondence between a level 1 cache and a level 2 cache, an address, which corresponds to the data, in a level 2 cache. When address space, which corresponds to the data, in a level 2 cache belongs to a level 2 cache corresponding to at least one other processor in the multi-core processor, the processor needs to find and acquire the data from the level 2 cache corresponding to the at least one other processor. When a working frequency of the at least one other processor is lower than a first frequency, a working frequency of the level 2 cache corresponding to the at least one other processor is also relatively low; therefore, it takes a longer time to acquire the data from the level 2 cache corresponding to the at least one other processor, and within the longer working time, relatively more system resources and power consumption are wasted. Therefore, switching a working mode of the multi-core processor that includes the one processor and the at least one other processor to the SMP mode better helps reduce power consumption.

If the address space, which corresponds to the data, in the level 2 cache is not found in the level 2 cache corresponding to the at least one other processor in the multi-core processor, the one processor in the multi-core processor accesses a snoop control unit (Snoop Control Unit, SCU) to acquire an access algorithm of the data from the SCU. For example, in the SCU, an access algorithm about data may be: when data is not found in the level 2 cache corresponding to the at least one other processor, the level 1 cache corresponding to the at least one other processor is accessed first; and if the data exists in the level 1 cache corresponding to the at least one other processor, the one processor in the multi-core processor reads the data from the level 1 cache corresponding to the at least one other processor. If the data does not exist in the level 1 cache corresponding to the at least one other processor, the one processor in the multi-core processor reads the data from a memory.

Figure 7:
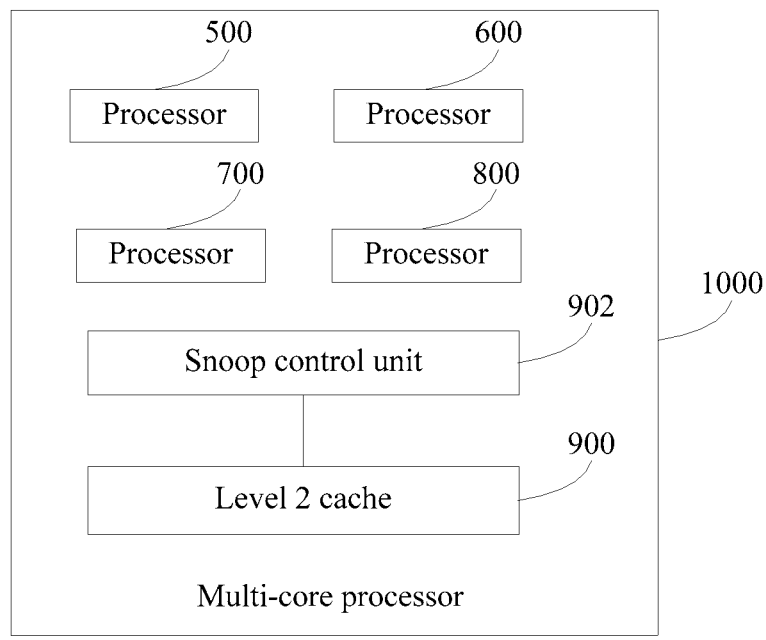
FIG. 7 is a structural block diagram of a multi-core processor according to Embodiment 8 of the present invention.

As shown in FIG. 7, a multi-core processor 1000 includes a processor 500, a processor 600, a processor 700, and a processor 800. The processor 500, the processor 600, the processor 700, and the processor 800 all include respective level 1 caches (not shown in the figure). A snoop control unit 902 is located between the processors and a level 2 cache 900, is a central intelligence agency of the multi-core processor 1000, and is responsible for providing management, such as interconnection, arbitration, communication, transmission between caches and inside a system memory, cache consistency, and another multi-core function, for the processors (such as the processor 500, the processor 600, the processor 700, and the processor 800 in FIG. 7) in the multi-core processor. For example, when the address space that corresponds to the data and that is in the level 2 cache is not found in the level 2 cache corresponding to the at least one other processor in the multi-core processor, the SCU may be responsible for reading the data from the level 1 cache corresponding to the at least one other processor according to the foregoing algorithm, or the one processor in the multi-core processor reads the data from a memory (which is not shown in the figure, and is located outside the multi-core processor 1000). The level 2 cache 900 is connected to the snoop control unit 902; when the data is not found in the level 2 cache 900, the processor that initiates data access can access the snoop control unit 902, so as to access, according to the algorithm included in the snoop control unit 902, the level 1 cache corresponding to the at least one other processor or the memory, thereby accessing the data.

A working frequency of a processor is related to a usage rate of the processor. A higher usage rate of the processor indicates a higher working frequency of the processor. The usage rate of the processor refers to a percentage usage rate that a time used by the processor to execute a non-system idle process accounts for in a total execution time of the processor. For example, within one second, if the processor works for 0.5 seconds at the usage rate of the processor, the usage rate of the processor is 50%.

A value of the first frequency may be a value within a low frequency range, for example, may be set to 500 MHz (megahertz) or lower.

In step S102 in Embodiment 1, usage rates of N processors in the multi-core processor are greater than the first usage threshold, where N is greater than or equal to 1, and is less than or equal to a quantity of processors in the multi-core processor minus one. In a case in which the usage rates of the N processors in the multi-core processor are large (that is, greater than the first usage threshold), the working mode of the multi-core processor may be the SMP manner. However, in this case, if the working mode is switched to the ASMP manner, the benefit of power consumption reduction cannot be reflected.

The first usage threshold may be a value of a relatively large usage rate, for example, may be set to 80% or larger.

In step S102 in Embodiment 1, that usage rates are unbalanced between processors in the multi-core processor means that usage rate differences between the processors in the multi-core processor are relatively large. Herein, that the usage rate differences are relatively large means that in the processors, at least a usage rate difference between one core and another core is greater than a third threshold. A specific value of the third threshold may be not limited. For example, the third threshold may be set to 50%. When the multi-core processor includes four processors, if a usage rate difference between at least two processors of the four processors is greater than 50%, usage rates are unbalanced between the four processors in the multi-core processor.

Embodiment 3

Figure 10:
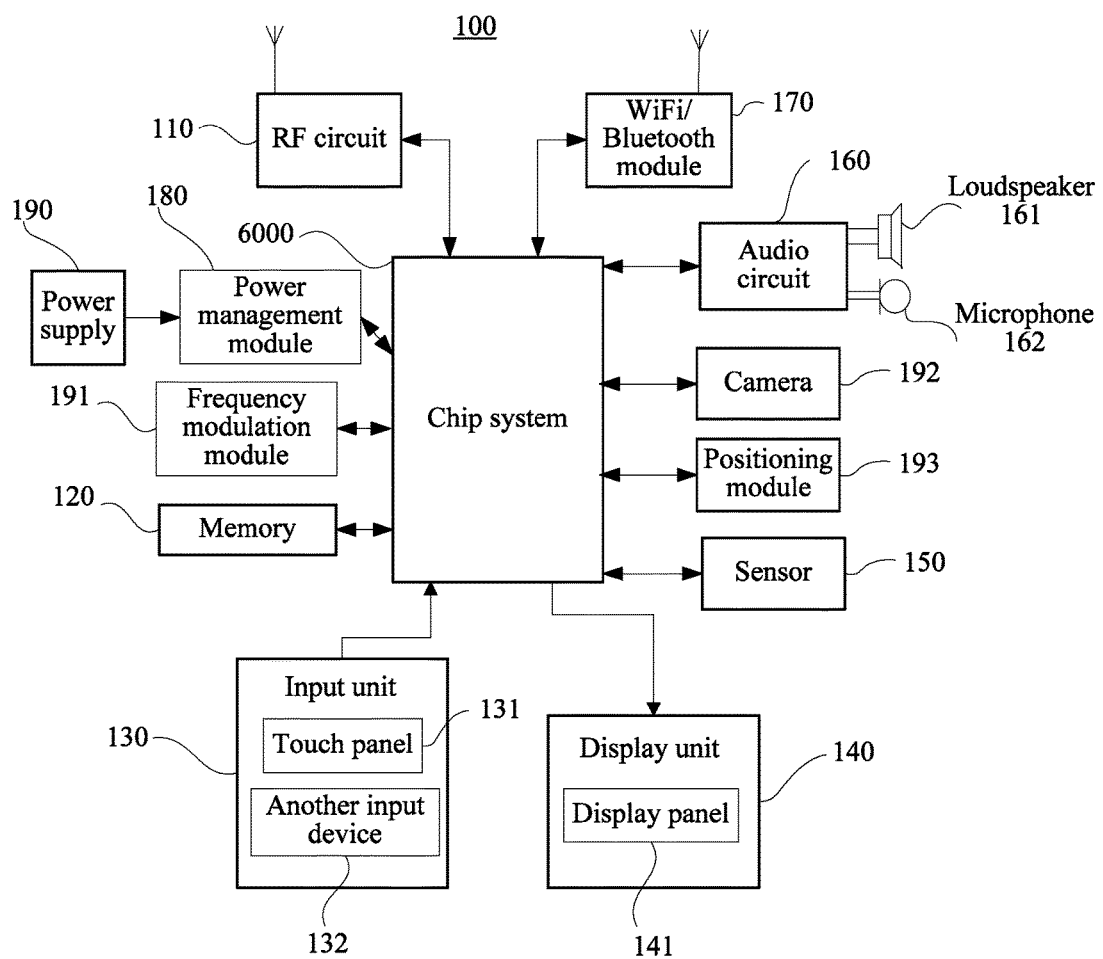
FIG. 10 is a structural block diagram of a mobile phone according to Embodiment 10 of the present invention.

This embodiment is based on Embodiment 1 and Embodiment 2, and a difference between Embodiment 1 and Embodiment 2 lies in that, as shown in step S106 in FIG. 3, after the working mode of the multi-core processor is switched to the SMP mode, or the working mode of the multi-core processor is switched to the ASMP mode, one processor in the multi-core processor further needs to store, to a memory connected to a chip system in which the multi-core processor is located, an association relationship between an application scenario of the chip system in which the multi-core processor is located and the switched-to working mode of the multi-core processor. As shown in FIG. 10, a location of the stored association relationship between the application scenario of the chip system in which the multi-core processor is located and the switched-to working mode of the multi-core processor may be in a memory 120 shown in FIG. 10. The memory 120 may include a volatile storage medium such as a memory, and/or a non-volatile storage medium such as a hard disk.

The application scenario of the chip system in which the multi-core processor is located includes different types of application scenarios such as a single scenario, a dual-scenario, and a multi-scenario.

If the application scenario of the chip system in which the multi-core processor is located is a single scenario, that is, only one application program runs in the chip system, in this case, the switched-to working mode of the multi-core processor and when the application program runs is recorded, and the working mode and the application program (the application scenario of the chip system in which the multi-core processor is located) are stored in a memory in an associated manner. For example, when there is only an ebook program in the application scenario of the chip system in which the multi-core processor is located, and a corresponding switched-to working mode of the multi-core processor is the ASMP mode, an ebook and the ASMP mode are stored in an associated manner.

If the application scenario of the chip system in which the multi-core processor is located is a dual-scenario or a multi-scenario, that is, at least two application programs run in the chip system, a switching result of the working mode of the multi-core processor may be obtained, and an association relationship between a working mode of the multi-core processor when a program runs in foreground and working modes of the multi-core processor when multiple application programs coexist does not need to be stored in a memory.

Specifically, if within a first predetermined time interval, a corresponding quantity of use times of the application scenario of the chip system in which the multi-core processor is located is greater than or equal to B1, and within the first predetermined time interval, a ratio of a quantity of use times of a working mode of the multi-core processor with a relatively large quantity of use times of the application scenario to a quantity of use times of a working mode, whose quantity of use times is relatively small, of the multi-core processor is greater than or equal to M, the association relationship between the application scenario of the chip system in which the multi-core processor is located and the switched-to working mode of the multi-core processor is stored, where M is an integer greater than 1, and B1 is an integer greater than or equal to 2.

Further, if within a first predetermined time interval, a corresponding quantity of use times of the application scenario of the chip system in which the multi-core processor is located is less than B1, or if within a first predetermined time interval, a ratio of a quantity of use times of a working mode of the multi-core processor with a relatively large quantity of use times of the application scenario to a quantity of use times of a working mode, whose quantity of use times is relatively small, of the multi-core processor is less than M, within a second predetermined time interval after the first predetermined time interval, if within the second predetermined time interval, a corresponding quantity of use times of the application scenario of the chip system in which the multi-core processor is located is greater than or equal to B2, and a ratio of a quantity of use times of a working mode, whose quantity of use times is relatively large, of the multi-core processor to a quantity of use times of a working mode, whose quantity of use times is relatively small, of the multi-core processor is greater than or equal to M, the association relationship between the application scenario of the chip system in which the multi-core processor is located and the switched-to working mode of the multi-core processor is stored, where B2 is an integer greater than or equal to 1.

Within a third predetermined time interval after the association relationship is stored in a database, steps in Embodiment 1 or Embodiment 2 are performed. If an execution result indicates that a working mode, which corresponds to the application scenario, of the multi-core processor is different from a stored working mode, which corresponds to the application scenario, of the multi-core processor, it indicates that the stored working mode, which corresponds to the application scenario, of the multi-core processor does not accord with the current working mode of the multi-core processor, and the association relationship between the application scenario of the chip system in which the multi-core processor is located and the switched-to working mode of the multi-core processor needs to be cleared. Therefore, the processor in the multi-core processor clears the association relationship between the application scenario of the chip system in which the multi-core processor is located and the switched-to working mode of the multi-core processor, and substitutes the current working mode of the multi-core processor for the originally stored working mode, which corresponds to the application scenario, of the multi-core processor, so as to store a correspondence between the current working mode of the multi-core processor and the application scenario.

According to the technical solution in Embodiment 3 of the present invention, the processor in the multi-core processor stores and timely updates the determined correspondence between the current working mode of the multi-core processor and the application scenario, for the convenience of subsequent query and modification.

Embodiment 4

Figure 4:
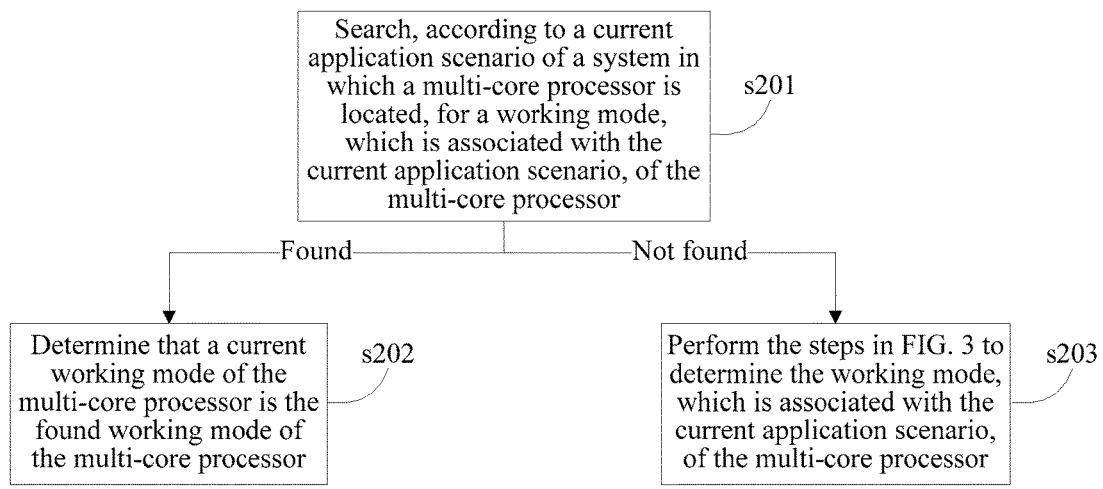
FIG. 4 is a flowchart of a method for managing a multi-core processor according to Embodiment 4 of the present invention.

This embodiment is based on Embodiment 1, Embodiment 2, and Embodiment 3, and a difference lies in that, as shown in FIG. 4, this embodiment further includes the following steps:

Step S201: Search, according to a current application scenario of the chip system in which the multi-core processor is located, for a working mode, which is associated with the current application scenario, of the multi-core processor. If the working mode, which is associated with the current application scenario, of the multi-core processor is found, go to step S202. If the working mode, which is associated with the current application scenario, of the multi-core processor is not found, go to step S203.

Step S202: Determine that a current working mode of the multi-core processor is the found working mode of the multi-core processor.

Step S203: Perform the steps in Embodiment 1, Embodiment 2, or Embodiment 3 to determine the working mode, which is associated with the current application scenario, of the multi-core processor.

According to the technical solution in Embodiment 4 of the present invention, after a correspondence between the current working mode of the multi-core processor and the application scenario is stored, a working mode, which corresponds to the application scenario, of the multi-core processor can be found according to the storage result, so that the steps for the current working mode of the multi-core processor in Embodiment 1, Embodiment 2, or Embodiment 3 are not performed.

All the content in the foregoing Embodiment 1 to Embodiment 4 of the present invention can be referenced in the following embodiments, and details are not described again below.

Embodiment 5

Figure 5:
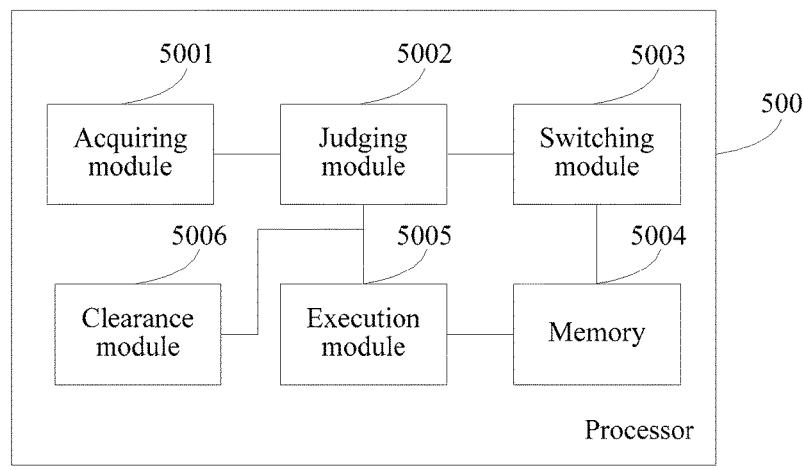
FIG. 5 is a structural block diagram of a processor according to Embodiment 5 and Embodiment 6 of the present invention.

FIG. 5 is a structural block diagram of one processor in a multi-core processor according to an embodiment of the present invention. The processor 500 may include multiple modules. Certainly, the processor 500 may also include a processing hardware platform, where the processing hardware platform executes an instruction that is stored in a non-volatile computer readable storage medium, to perform functions of multiple modules, where the multiple modules include: an acquiring module 5001, a judging module 5002, and a switching module 5003.

The acquiring module 5001 is configured to acquire a working frequency of at least one other processor than one processor that requests data, a difference between a cache hit ratio value corresponding to the one processor and a cache hit ratio value corresponding to the at least one other processor, a cache hit ratio value corresponding to the one processor, and usage rates of N processors in the multi-core processor.

The judging module 5002 is configured to determine, when a current working mode of the multi-core processor is an asymmetric multiprocessing ASMP mode, whether the working frequency of the at least one other processor than the one processor that requests data is less than a first frequency, and whether the difference between the cache hit ratio value corresponding to the one processor and the cache hit ratio value corresponding to the at least one other processor is greater than or equal to a first threshold; and configured to determine, when the current working mode of the multi-core processor is an SMP mode, whether the cache hit ratio value corresponding to the one processor is greater than or equal to a second threshold, whether the usage rates are unbalanced between the processors in the multi-core processor, and whether usage rates of N processors in the multi-core processor are greater than a first usage threshold.

The switching module 5003 is configured to: when the judging module determines that the current working mode of the multi-core processor is the asymmetric multiprocessing ASMP mode, the working frequency of the at least one other processor than the one processor that requests data is less than the first frequency, and the difference between the cache hit ratio value corresponding to the one processor and the cache hit ratio value corresponding to the at least one other processor is greater than or equal to the first threshold, switch the working mode of the multi-core processor to the symmetric multiprocessing SMP mode; or when the judging module determines that the current working mode of the multi-core processor is the SMP mode, the cache hit ratio value corresponding to the one processor is greater than or equal to the second threshold, the usage rates are unbalanced between the processors in the multi-core processor, and the usage rates of the N processors in the multi-core processor are greater than the first usage threshold, switch the working mode of the multi-core processor to the ASMP mode, where N is greater than or equal to 1, and is less than or equal to a quantity of processors in the multi-core processor minus one.

For a specific limitation on the functions performed by the foregoing modules and related concepts, reference may be made to a related part in Embodiment 2 for implementation, and details are not described again in this embodiment.

In Embodiment 5 of the present invention, a technical solution is used, where whether a working mode of the multi-core processor should be in an SMP mode or an ASMP mode is determined according to determining conditions, for example, whether a working frequency of at least one other processor than one processor that requests data is less than a first frequency, and whether a difference between a cache hit ratio value corresponding to the one processor and a cache hit ratio value corresponding to the at least one other processor is greater than or equal to a first threshold; and whether the cache hit ratio value corresponding to the one processor is greater than or equal to a second threshold, whether usage rates are unbalanced between processors in the multi-core processor, and whether usage rates of N processors in the multi-core processor are greater than a first usage threshold. In this way, the multi-core processor selects the ASMP mode in a case in which the usage rates are unbalanced and the usage rates of the processors in the multi-core processor are relatively high, thereby avoiding power consumption and power loss that are caused by a same frequency and supply voltage; and the multi-core processor selects the SMP mode in a case in which a level 1 cache hit rate of a processor is not high, and data needs to be acquired from a cache corresponding to a processor with a lower frequency, which therefore can also avoid unnecessary power consumption and power loss.

Embodiment 6

This embodiment is based on Embodiment 5, and a difference between this embodiment and Embodiment 5 lies in that, multiple modules of the processor 500 in this embodiment further include a memory 5004 shown in FIG. 5, configured to: after the working mode of the multi-core processor is switched to the SMP mode, or the working mode of the multi-core processor is switched to the ASMP mode, store an association relationship between an application scenario of a chip system in which the multi-core processor is located and the switched-to working mode of the multi-core processor.

The storage module 5004 may be specifically configured to: when within a first predetermined time interval, a corresponding quantity of use times of the application scenario of the chip system in which the multi-core processor is located is greater than or equal to B1, and a ratio of a quantity of use times of a working mode, whose quantity of use times is relatively large, of the multi-core processor to a quantity of use times of a working mode, whose quantity of use times is relatively small, of the multi-core processor is greater than or equal to M, store the association relationship between the application scenario of the chip system in which the multi-core processor is located and the switched-to working mode of the multi-core processor, where M is an integer greater than 1, and B1 is an integer greater than or equal to 2.

The storage module 5004 is further specifically configured to: when within the first predetermined time interval, the corresponding quantity of use times of the application scenario of the chip system in which the multi-core processor is located is less than B1, or the ratio of the quantity of use times of the working mode, whose quantity of times is relatively large, of the multi-core processor to the quantity of use times of the working mode, whose quantity of use times is relatively small, of the multi-core processor is less than M, and within a second predetermined time interval after the first predetermined time interval, if within the second predetermined time interval, the corresponding quantity of use times of the application scenario of the chip system in which the multi-core processor is located is greater than or equal to B2, and the ratio of the quantity of use times of the working mode, whose quantity of use times is relatively large, of the multi-core processor to the quantity of use times of the working mode, whose quantity of use times is relatively small, of the multi-core processor is greater than or equal to M, store the association relationship between the application scenario of the chip system in which the multi-core processor is located and the switched-to working mode of the multi-core processor, where B2 is an integer greater than or equal to 1.

Multiple modules of the processor in this embodiment may further include an execution module 5005 shown in FIG. 5, configured to: within a third predetermined time interval after the association relationship is stored in a database, perform the steps in Embodiment 1, Embodiment 2, or Embodiment 3.

The judging module 5002 shown in FIG. 5 is further configured to determine whether an execution result indicates that a working mode, which corresponds to the application scenario, of the multi-core processor is different from a stored working mode, which corresponds to the application scenario, of the multi-core processor.

The foregoing multiple modules shown in FIG. 5 further include a clearance module 5006, configured to: when a determining result of the judging module indicates that the working mode, which corresponds to the application scenario, of the multi-core processor is different from the working mode, which corresponds to the application scenario and is stored in the learning database, of the multi-core processor, clear the association relationship between the application scenario of the chip system in which the multi-core processor is located and the switched-to working mode of the multi-core processor.

According to the technical solution in Embodiment 6 of the present invention, the processor in the multi-core processor stores and timely updates the determined correspondence between the current working mode of the multi-core processor and the application scenario, for the convenience of subsequent query and modification.

Embodiment 7

Figure 6:
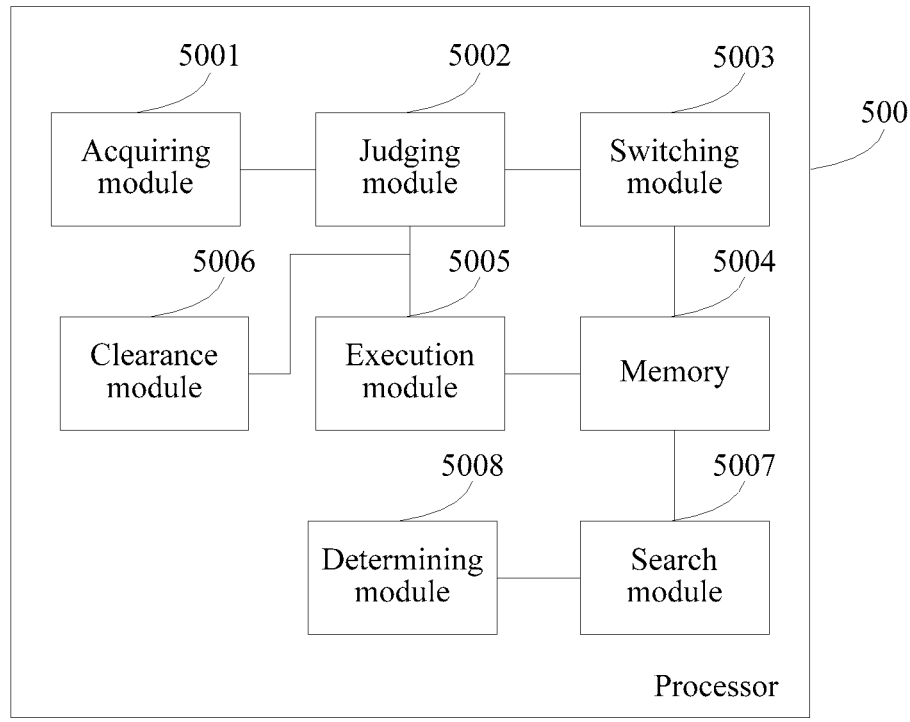
FIG. 6 is a structural block diagram of a processor according to Embodiment 7 of the present invention.

This embodiment is based on Embodiment 6, and a difference between this embodiment and Embodiment 6 lies in that, as shown in FIG. 6, multiple modules of the processor 500 in this embodiment further include:

a search module 5007, configured to search, according to a current application scenario of the chip system in which the multi-core processor is located, for a working mode, which is associated with the current application scenario, of the multi-core processor; and a determining module 5008, configured to: when the working mode, which is associated with the current application scenario, of the multi-core processor is found, determine that a current working mode of the multi-core processor is the found working mode of the multi-core processor; or when the working mode, which is associated with the current application scenario, of the multi-core processor is not found, perform the steps in Embodiment 1, Embodiment 2, or Embodiment 3 to determine the working mode, which is associated with the current application scenario, of the multi-core processor.

According to the technical solution in Embodiment 7 of the present invention, after the determined correspondence between the current working mode of the multi-core processor and the application scenario is stored, a working mode, which corresponds to the application scenario, of the multi-core processor can be found according to the storage result, so that the steps for the current working mode of the multi-core processor in Embodiment 1, Embodiment 2, or Embodiment 3 are not performed.

The processor in Embodiment 5 to Embodiment 7 of the present invention may be one processor in a multi-core processor or a scheduling processor. The scheduling processor is responsible for scheduling resources of processors in the multi-core processor.

When the processor in Embodiment 5 to Embodiment 7 of the present invention is a scheduling processor, the acquiring module in the processor is specifically configured to acquire, from a memory in the multi-core processor, a level 1 cache hit rate value, which is stored in the memory by one processor in the multi-core processor, of the one processor in the multi-core processor.

Embodiment 8

This embodiment provides a multi-core processor 1000. As shown in FIG. 7, the multi-core processor 1000 includes four processors in total: a processor 500, a processor 600, a processor 700, and a processor 800, a snoop control unit 902, and a level 2 cache 900. Any processor of the four processors: the processor 500, the processor 600, the processor 700, and the processor 800 may complete the steps according to Embodiment 1, Embodiment 2, or Embodiment 3.

For functions of the snoop control unit 902 and the level 2 cache 900 that are shown in FIG. 7, reference may be made to descriptions about FIG. 7 in Embodiment 2. Details are not described herein again.

In this embodiment, a snoop control unit coordinates a relationship between processors and coordinates a relationship between a level 1 cache and a level 2 cache, and a channel for the processors to access data is provided, so that the processors that form a structure of a multi-core processor implement interaction and communication between the processors in the multi-core processor.

Embodiment 9

Figure 8:
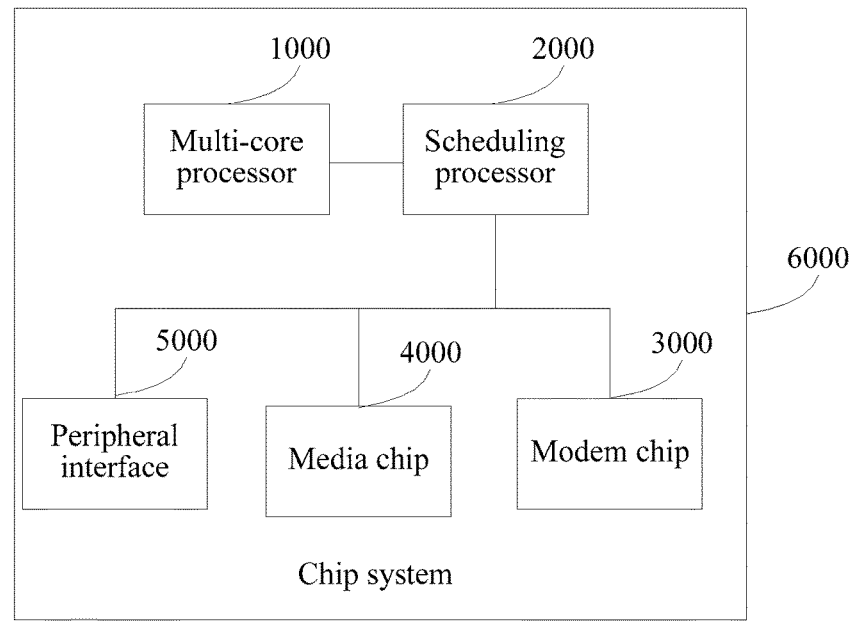
FIG. 8 is a structural block diagram of a chip system according to Embodiment 9 of the present invention.

As shown in FIG. 8, this embodiment provides a chip system 6000, including a multi-core processor 1000, a scheduling processor 2000, a modulation and demodulation chip 3000, a media chip 4000, and a peripheral interface 5000. A structure and a function of the multi-core processor 1000 are described in Embodiment 8, and details are not described herein again.

The multi-core processor 1000 may be a processor for a main operating system and an application program that run in a terminal in which the chip system is located.

The scheduling processor 2000 generally includes a low-power-consumption micro control unit (Micro Control Unit, MCU), configured to schedule power supply and clock frequencies of processors in the multi-core processor 1000, and coordinate a working time sequence for the multi-core processor 1000, the modulation and demodulation chip 3000, the media chip 4000, and the peripheral interface 5000, so that within a time, one of the multi-core processor 1000, the modulation and demodulation chip 3000, the media chip 4000, and the peripheral interface 5000 works, or several of them work collaboratively.

The modulation and demodulation chip 3000 is configured to process a baseband signal, and specifically, the modulation and demodulation chip 3000 synthesizes a baseband signal that is to be sent, or decodes a received baseband signal.

The media chip 4000 is configured to process an image and/or a video signal. Specifically, the media chip 4000 may include an image processor, an encoder, and a decoder. The image processor may include a dedicated processor and an image two-dimensional processor. The encoder and the decoder respectively encode and decode an image and/or a video signal.

The peripheral interface 5000 may include various interfaces for connecting to a peripheral device. For example, the peripheral interface 5000 may include an interface for connecting to an external memory, an interface for connecting to an image or video collector, an interface for connecting to a display device, an interface for connecting to an input device, an interface for connecting to a power management module, an interface for connecting to a wireless short-distance communication device, an interface for connecting to a sensor, an interface that can connect the terminal in which the chip system is located and that is used as a USB secondary device to a host, an interface that can connect the terminal in which the chip system is located and that is used as a USB primary device to a USB insertion device, an interface for connecting to a positioning module, an interface for connecting to a frequency modulation module, an interface for debugging, and the like.

Embodiment 10

Figure 9:
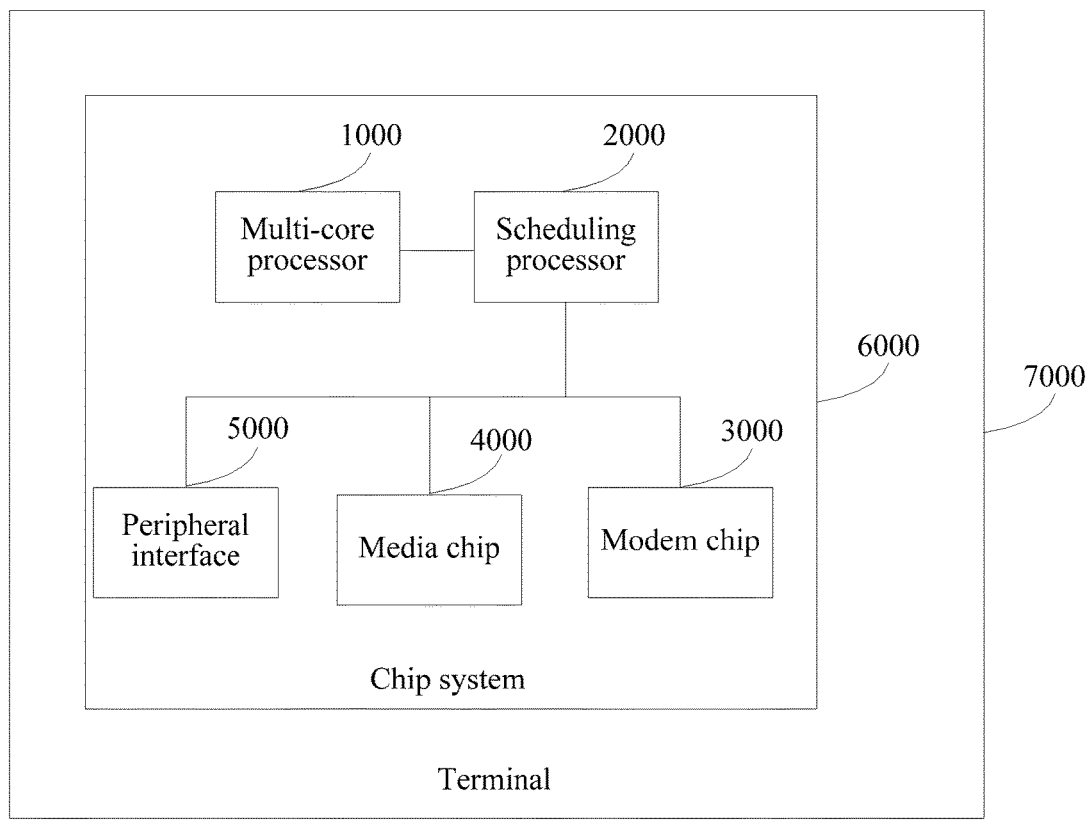
FIG. 9 is a structural block diagram of a terminal according to Embodiment 10 of the present invention.

As shown in FIG. 9, a terminal 7000 includes a chip system 6000 according to Embodiment 9. A specific structure and function of the chip system 6000 have been described in detail in Embodiment 9, and details are not described herein again.

As a specific example of a terminal, as shown in FIG. 10, the terminal 7000 may be a mobile terminal. The mobile terminal may include a mobile phone, a tablet computer, a PDA (Personal Digital Assistant, personal digital assistant), a POS (Point of Sales, point of sales), an in-vehicle computer, or the like.

As an example, the mobile terminal is a mobile phone. FIG. 10 is a block diagram of a structure of a part of a mobile phone 100 related to an embodiment of the present invention. Referring to FIG. 10, the mobile phone 100 includes components such as an RF (Radio Frequency, radio frequency) circuit 110, a memory 120, an input unit 130, a display unit 140, a sensor 150, an audio circuit 160, a WiFi (wireless fidelity, wireless fidelity) module 170, a power management module 180, a power supply 190, a frequency modulation module 191, a camera 192, and a positioning module 193. A person skilled in the art can understand that the structure of the mobile phone shown in FIG. 10 does not constitute a limitation to the mobile phone, and the mobile phone may include more components or fewer components than those shown in the figure, or some components may be combined, or a different component deployment may be used.

With reference to FIG. 10, the following specifically describes the components of the mobile phone 100:

The RF circuit 110 may be configured to receive and send signals during an information receiving and sending process or a call process. Particularly, the RF circuit 110 receives downlink information from a base station, then delivers the downlink information to the chip system 6000 for processing; and sends related uplink data to the base station. Generally, the RF circuit includes, but is not limited to, an antenna, at least one amplifier, a transceiver, a coupler, an LNA (Low Noise Amplifier, low noise amplifier), and a duplexer. In addition, the RF circuit 110 may also communicate with a network and another device by means of wireless communication. The wireless communication may use any communications standard or protocol, which includes, but is not limited to, GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), e-mail, SMS (Short Messaging Service, Short Messaging Service), UMTS (Universal Mobile Telecommunications System, Universal Mobile Telecommunications System), TD-SCDMA (Time Division-Synchronous Code Division Multiple Access, Time Division-Synchronous Code Division Multiple Access), and the like.

The memory 120 may be configured to store a software program and module. The processor 180 runs the software program and module stored in the memory 120, to implement various functional applications and data processing of the mobile phone 100. The memory 120 may mainly include a program storage area and a data storage area, where the program storage area may store an operating system, an application program required by at least one function (such as a sound playback function and an image display function), and the like; and the data storage area may store data (such as audio data and a telephone directory) created according to use of the mobile phone 100, and the like. In addition, the memory 120 may include a high speed random access memory, and may also include a non-volatile memory, such as at least one magnetic disk storage device, a flash memory, or another volatile solid-state storage device (such as a memory).

The input unit 130 may be configured to receive input digit or character information, and generate a keyboard signal input related to the user setting and function control of the mobile phone 100. Specifically, the input unit 130 may include a touch panel 131 and another input device 132. The touch panel 131, also referred to as a touchscreen, may collect a touch operation of a user on or near the touch panel 131 (such as an operation of a user on the touch panel 131 or near the touch panel 131 by using any suitable object or accessory such as a finger or a stylus), and drive a corresponding connection apparatus according to a preset program. Optionally, the touch panel 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information to touch point coordinates, and sends the touch point coordinates to the processor 180. Moreover, the touch controller can receive and execute a command sent by the processor 180. In addition, the touch panel 131 may be a resistive, capacitive, infrared, or surface sound wave type touch panel. Besides the touch panel 131, the input unit 130 may further include the another input device 132. Specifically, the another input device 132 may include, but is not limited to, one or more of a physical keyboard, a function key (such as a volume control key or a switch key), a track ball, a mouse, and a joystick.

The display unit 140 may be configured to display information input by the user or information provided for the user, and various menus of the mobile phone 100. The display unit 140 may include a display panel 141, and optionally, the display panel 141 may be configured in a form, such as an LCD (Liquid Crystal Display, liquid crystal display) or an OLED (Organic Light-Emitting Diode, organic light-emitting diode). Further, the touch panel 131 may cover the display panel 141. After detecting a touch operation on or near the touch panel 131, the touch panel 131 transfers the touch operation to the processor 180, so as to determine the type of the touch event. Then, the processor 180 provides a corresponding visual output on the display panel 141 according to the type of the touch event. Although in FIG. 10, the touch panel 131 and the display panel 141 are used as two separate components to implement input and output functions of the mobile phone 100, in some embodiments, the touch panel 131 and the display panel 141 may be integrated to implement the input and output functions of the mobile phone 100.

The mobile phone 100 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the mobile phone 100 is moved to the ear. As one type of motion sensor, an acceleration sensor can detect magnitude of accelerations in various directions (generally on three axes), can detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. As for other sensors such as a gyroscope, a barometer, a hygrometer, a thermometer, and an infrared sensor that may be further configured in the mobile phone 100, details are not described again herein.

The audio circuit 160, a loudspeaker 161, and a microphone 162 may provide audio interfaces between the user and the mobile phone 100. The audio circuit 160 may convert received audio data into an electrical signal and transmit the electrical signal to the loudspeaker 161. The loudspeaker 161 converts the electrical signal into a sound signal for output. On the other hand, the microphone 162 converts a collected sound signal into an electrical signal. The audio circuit 160 receives the electrical signal, converts the electrical signal into audio data, and outputs the audio data to the RF circuit 108, so as to send the audio data to, for example, another mobile phone, or outputs the audio data to the memory 120 for further processing.

Both WiFi and Bluetooth are short distance wireless transmission technologies. The mobile phone 100 may help, by using the WiFi/Bluetooth module 170, the user to receive and send e-mails, browse a webpage, access streaming media, and the like, which provides wireless broadband Internet access for the user. Although FIG. 10 shows the WiFi/Bluetooth module 170, it may be understood that, the WiFi/Bluetooth module 170 is not a necessary component of the mobile phone 100, and when required, the WiFi/Bluetooth module 170 may be omitted as long as the scope of the essence of the present invention is not changed.

The chip system 6000 is a control center of the mobile phone 100, and is connected to various parts of the entire mobile phone by using various interfaces and lines. By running or executing the software program and/or module stored in the memory 120, and invoking data stored in the memory 120, the chip system 6000 performs various functions and data processing of the mobile phone 100, thereby performing overall monitoring on the mobile phone. Optionally, the chip system 6000 may include one or more processing units. Preferably, the chip system 6000 may integrate an application processor and a modem processor, where the application processor mainly processes an operating system, a user interface, an application program, and the like, and the modem processor mainly processes wireless communication. It can be understood that, the foregoing modem processor may also not be integrated into the chip system 6000.

The mobile phone 100 further includes the power supply 190 (such as a battery) for supplying power to the components. Preferably, the power supply may be logically connected to the chip system 6000 by using a power management module 180, thereby implementing functions, such as charging, discharging, and power consumption management, by using the power management module 180.

Although not shown in the figure, the mobile phone 100 may further include the frequency modulation module 191, the camera 192, the positioning module 193, and the like. Details are not described herein again.

The following technical effects can be achieved by using one or more technical solutions in the embodiments of this application:

In the one or more technical solutions in the embodiments of this application, a technical solution is used, where whether a working mode of the multi-core processor should be in an SMP mode or an ASMP mode is determined according to determining conditions, for example, whether a working frequency of at least one other processor than one processor that requests data is less than a first frequency, and whether a difference between a cache hit ratio value corresponding to the one processor and a cache hit ratio value corresponding to the at least one other processor is greater than or equal to a first threshold; and whether the cache hit ratio value corresponding to the one processor is greater than or equal to a second threshold, whether usage rates are unbalanced between processors in the multi-core processor, and whether usage rates of N processors in the multi-core processor are greater than a first usage threshold. In this way, the multi-core processor selects the ASMP mode in a case in which the usage rates are unbalanced and the usage rates of the processors in the multi-core processor are relatively high, thereby avoiding power consumption and power loss that are caused by a same frequency and supply voltage; and the multi-core processor selects the SMP mode in a case in which a level 1 cache hit rate of a processor is not high, and data needs to be acquired from a cache corresponding to a processor with a lower frequency, which therefore can also avoid unnecessary power consumption and power loss.

Embodiment 11

If an application scenario of a chip system in which a multi-core processor is located is a single scenario, that is, only one application program runs in the chip system, as described in Embodiment 3, a switched-to working mode of the multi-core processor when the application program runs and the application program (the application scenario of the chip system in which the multi-core processor is located) need to be stored in a memory in an associated manner. The working mode of the multi-core processor when the application program runs may not be acquired in the manner in Embodiment 1 or Embodiment 2. In this embodiment, the working mode of the multi-core processor when the application program runs is obtained in a manner of measuring power consumption, when the application program runs, of a terminal. As shown in FIG. 10, power consumption, when the application program runs, of a terminal 7000 may be measured by using a power consumption measurement device (such as a direct-current regulated power supply) or an electricity meter that is connected to a power supply 190. Power consumption of the terminal 7000 when the working mode of the multi-core processor when the application program runs is an SMP mode and an ASMP mode is separately measured, and the power consumption of the terminal 7000 when the working mode of the multi-core processor when the application program runs is the SMP mode is compared with the power consumption of the terminal 7000 when the working mode of the multi-core processor when the application program runs is the ASMP mode. Then a working mode, with relatively small power consumption, of the multi-core processor is used as the working mode of the multi-core processor when the application program runs, and the working mode of the multi-core processor when the application program runs and the application program are stored in the memory in the associated manner.

In the solution in this embodiment, terminal power consumption when a working mode of a multi-core processor is separately an SMP mode and an ASMP mode may be measured by using a terminal power consumption measurement device that is connected to a power supply 190. The power consumption in the SMP mode is compared with the power consumption in the ASMP mode, so as to determine a working mode, when a current application program runs, of the multi-core processor. Therefore, this embodiment may provide a more direct manner of determining power consumption of a terminal in a single-scenario mode.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A non-transitory computer readable storage medium storing instructions which, when executed, cause a processor to perform operations comprising:
    acquiring a working frequency of at least one other processor than one processor that requests data;
    acquiring a difference between a cache hit ratio value corresponding to the one processor and a cache hit ratio value corresponding to the at least one other processor;
    acquiring the cache hit ratio value corresponding to the one processor;
    acquiring usage rates of N processors in a multi-core processor;
    when a current working mode of the multi-core processor is an asymmetric multiprocessing (ASMP) mode:
        determining that the working frequency of the at least one other processor than the one processor that requests data is less than a first frequency, and that the difference between the cache hit ratio value corresponding to the one processor and the cache hit ratio value corresponding to the at least one other processor is greater than or equal to a first threshold; and
        in response to the determining, switching the working mode of the multi-core processor to an symmetric multiprocessing (SMP) mode; and
    when the current working mode of the multi-core processor is the SMP mode:
        determining that the cache hit ratio value corresponding to the one processor is greater than or equal to a second threshold, that the usage rates are unbalanced between processors in the multi-core processor, and that the usage rates of N processors in the multi-core processor are greater than a first usage threshold; and
        in response to the determining, switching the working mode of the multi-core processor to the ASMP mode; and
    wherein N is greater than or equal to 1, and is less than or equal to a quantity of processors in the multi-core processor minus one.

2. The non-transitory computer readable storage medium according to claim 1, wherein
    the difference between the cache hit ratio value corresponding to the one processor and the cache hit ratio value corresponding to the at least one other processor is a difference between a level 2 cache hit ratio value corresponding to the one processor and a level 2 cache hit ratio value corresponding to the at least one other processor; and
    the cache hit ratio value corresponding to the one processor is a level 1 cache hit ratio value of the one processor.

3. The non-transitory computer readable storage medium according to claim 1, wherein
    the difference between the cache hit ratio value corresponding to the one processor and the cache hit ratio value corresponding to the at least one other processor is a difference between a level 2 cache hit ratio value corresponding to the one processor and a level 2 cache hit ratio value corresponding to the at least one other processor; and
    the cache hit ratio value corresponding to the one processor is the level 2 cache hit ratio value of the one processor.

4. The non-transitory computer readable storage medium according to claim 1, wherein
the difference between the cache hit ratio value corresponding to the one processor and the cache hit ratio value corresponding to the at least one other processor is a difference between a level 1 cache hit ratio value corresponding to the one processor and a level 1 cache hit ratio value corresponding to the at least one other processor; and
the cache hit ratio value corresponding to the one processor is the level 1 cache hit ratio value of the one processor.

5. The non-transitory computer readable storage medium according to claim 1, wherein
the difference between the cache hit ratio value corresponding to the one processor and the cache hit ratio value corresponding to the at least one other processor is a difference between a level 1 cache hit ratio value corresponding to the one processor and a level 1 cache hit ratio value corresponding to the at least one other processor; and
the cache hit ratio value corresponding to the one processor is a level 2 cache hit ratio value of the one processor.

6. The non-transitory computer readable storage medium according to claim 1, wherein the operations further comprise:
after the working mode of the multi-core processor is switched storing an association relationship between an application scenario of a chip system in which the multi-core processor is located and the switched-to working mode of the multi-core processor.

7. The non-transitory computer readable storage medium according to claim 6, wherein the operations further comprise:
when within a first predetermined time interval, a corresponding quantity of use times of the application scenario of the chip system in which the multi-core processor is located is greater than or equal to B1, and a ratio of a quantity of use times of a working mode of the multi-core processor to a quantity of use times of a working mode of the multi-core processor is greater than or equal to M, storing the association relationship between the application scenario of the chip system in which the multi-core processor is located and the switched-to working mode of the multi-core processor, wherein
M is an integer greater than 1, and B1 is an integer greater than or equal to 2.

8. The non-transitory computer readable storage medium according to claim 7, wherein the operations further comprise:
when within the first predetermined time interval, the corresponding quantity of use times of the application scenario of the chip system in which the multi-core processor is located is less than B1, or the ratio of the quantity of use times of the working mode of the multi-core processor to the quantity of use times of the working mode of the multi-core processor is less than M, and
within a second predetermined time interval after the first predetermined time interval, if within the second predetermined time interval, the corresponding quantity of use times of the application scenario of the chip system in which the multi-core processor is located is greater than or equal to B2, and the ratio of the quantity of use times of the working mode of the multi-core processor to the quantity of use times of the working mode, of the multi-core processor is greater than or equal to M:
storing the association relationship between the application scenario of the chip system in which the multi-core processor is located and the switched-to working mode of the multi-core processor, wherein B2 is an integer greater than or equal to 1.

9. The non-transitory computer readable storage medium according to claim 6, wherein the working mode is switched within a third predetermined time interval after the association relationship is stored in a database, and the operations further comprise:
determining whether an execution result indicates that a working mode, which corresponds to the application scenario, of the multi-core processor is different from a working mode, which corresponds to the application scenario and is stored in a learning database, of the multi-core processor; and
when the working mode, which corresponds to the application scenario, of the multi-core processor is different from the working mode, which corresponds to the application scenario and is stored in the learning database, of the multi-core processor, clearing the association relationship between the application scenario of the chip system in which the multi-core processor is located and the switched-to working mode of the multi-core processor.

10. The non-transitory computer readable storage medium according to claim 6, wherein the operations further comprise:
searching, according to a current application scenario of the chip system in which the multi-core processor is located, for a working mode, which is associated with the current application scenario, of the multi-core processor; and
when the working mode, which is associated with the current application scenario, of the multi-core processor is found, determining that a current working mode of the multi-core processor is the found working mode of the multi-core processor; or when the working mode, which is associated with the current application scenario, of the multi-core processor is not found, determining the working mode, which is associated with the current application scenario, of the multi-core processor.

11. The non-transitory computer readable storage medium according to claim 1, wherein the processor is one processor in the multi-core processor.

12. The non-transitory computer readable storage medium according to claim 1, wherein the processor is a scheduling processor.

13. The non-transitory computer readable storage medium according to claim 12, wherein the operations further comprise:
acquiring, from a memory in the multi-core processor, a level 1 cache hit rate value, which is stored in the memory by one processor in the multi-core processor, of the one processor in the multi-core processor.

14. A processor, comprising a processing hardware platform, wherein the processing hardware platform is configured to execute an instruction that is stored in a non-transitory computer readable storage medium, the instruction causing the processor to:
acquire a working frequency of at least one other processor than one processor that requests data; acquire a difference between a cache hit ratio value corresponding to the one processor and a cache hit ratio value corresponding to the at least one other processor;
acquire the cache hit ratio value corresponding to the one processor;
acquire usage rates of N processors in a multi-core processor;
when a current working mode of the multi-core processor is an asymmetric multiprocessing (ASMP) mode:
  determine that the working frequency of the at least one other processor than the one processor that requests data is less than a first frequency, and that the difference between the cache hit ratio value corresponding to the one processor and the cache hit ratio value corresponding to the at least one other processor is greater than or equal to a first threshold; and
  in response to the determining, switch the working mode of the multi-core processor to an symmetric multiprocessing (SMP) mode; and
when the current working mode of the multi-core processor is the SMP mode:
  determine that the cache hit ratio value corresponding to the one processor is greater than or equal to a second threshold, that the usage rates are unbalanced between processors in the multi-core processor, and that the usage rates of N processors in the multi-core processor are greater than a first usage threshold; and
  in response to the determining, switch the working mode of the multi-core processor to the ASMP mode; and
wherein N is greater than or equal to 1, and is less than or equal to a quantity of processors in the multi-core processor minus one.

15. The processor according to claim 14, wherein
the difference between the cache hit ratio value corresponding to the one processor and the cache hit ratio value corresponding to the at least one other processor is a difference between a level 2 cache hit ratio value corresponding to the one processor and a level 2 cache hit ratio value corresponding to the at least one other processor; and
the cache hit ratio value corresponding to the one processor is a level 1 cache hit ratio value of the one processor.

16. The processor according to claim 14, wherein
the difference between the cache hit ratio value corresponding to the one processor and the cache hit ratio value corresponding to the at least one other processor is a difference between a level 2 cache hit ratio value corresponding to the one processor and a level 2 cache hit ratio value corresponding to the at least one other processor; and
the cache hit ratio value corresponding to the one processor is the level 2 cache hit ratio value of the one processor.

17. The processor according to claim 14, wherein
the difference between the cache hit ratio value corresponding to the one processor and the cache hit ratio value corresponding to the at least one other processor is a difference between a level 1 cache hit ratio value corresponding to the one processor and a level 1 cache hit ratio value corresponding to the at least one other processor; and
the cache hit ratio value corresponding to the one processor is the level 1 cache hit ratio value of the one processor.

18. The processor according to claim 14, wherein
the difference between the cache hit ratio value corresponding to the one processor and the cache hit ratio value corresponding to the at least one other processor is a difference between a level 1 cache hit ratio value corresponding to the one processor and a level 1 cache hit ratio value corresponding to the at least one other processor; and
the cache hit ratio value corresponding to the one processor is a level 2 cache hit ratio value of the one processor.

19. The processor according to claim 14, the instruction further causing the processor to:
after the working mode of the multi-core processor is switched store an association relationship between an application scenario of a chip system in which the multi-core processor is located and the switched-to working mode of the multi-core processor.

20. The processor according to claim 19, the instruction further causing the processor to:
when within a first predetermined time interval, a corresponding quantity of use times of the application scenario of the chip system in which the multi-core processor is located is greater than or equal to B1, and a ratio of a quantity of use times of a working mode of the multi-core processor to a quantity of use times of a working mode of the multi-core processor is greater than or equal to M, store the association relationship between the application scenario of the chip system in which the multi-core processor is located and the switched-to working mode of the multi-core processor, wherein
M is an integer greater than 1, and B1 is an integer greater than or equal to 2.

21. The processor according to claim 20, the instruction further causing the processor to:
when within the first predetermined time interval, the corresponding quantity of use times of the application scenario of the chip system in which the multi-core processor is located is less than B1, or the ratio of the quantity of use times of the working mode of the multi-core processor to the quantity of use times of the working mode of the multi-core processor is less than M, and
within a second predetermined time interval after the first predetermined time interval, if within the second predetermined time interval, the corresponding quantity of use times of the application scenario of the chip system in which the multi-core processor is located is greater than or equal to B2, and the ratio of the quantity of use times of the working mode of the multi-core processor to the quantity of use times of the working mode of the multi-core processor is greater than or equal to M:
  store the association relationship between the application scenario of the chip system in which the multi-core processor is located and the switched-to working mode of the multi-core processor, wherein B2 is an integer greater than or equal to 1.

22. The processor according to claim 19, wherein
the working mode is switched within a third predetermined time interval after the association relationship is stored in a database, and the instruction further causing the processor to:
determine whether an execution result indicates that a working mode, which corresponds to the application scenario, of the multi-core processor is different from a working mode, which corresponds to the application scenario and is stored in a learning database, of the multi-core processor; and when the working mode, which corresponds to the application scenario, of the multi-core processor is different from the working mode, which corresponds to the application scenario and is stored in the learning database, of the multi-core processor, clear the association relationship between the application scenario of the chip system in which the multi-core processor is located and the switched-to working mode of the multi-core processor.

23. The processor according to claim 19, the instruction further causing the processor to:

search, according to a current application scenario of the chip system in which the multi-core processor is located, for a working mode, which is associated with the current application scenario, of the multi-core processor; and when the working mode, which is associated with the current application scenario, of the multi-core processor is found, determine that a current working mode of the multi-core processor is the found working mode of the multi-core processor; or when the working mode, which is associated with the current application scenario, of the multi-core processor is not found, determine the working mode, which is associated with the current application scenario, of the multi-core processor.

24. The processor according to claim 14, wherein the processor is one processor in the multi-core processor.

25. The processor according to claim 14, wherein the processor is a scheduling processor.

26. The processor according to claim 25, the instruction further causing the processor to:

acquire, from a memory in the multi-core processor, a level 1 cache hit rate value, which is stored in the memory by one processor in the multi-core processor, of the one processor in the multi-core processor.

* * * * *